(12) United States Patent
Urushihara et al.

(10) Patent No.: US 7,865,143 B2
(45) Date of Patent: Jan. 4, 2011

(54) RADIO TERMINAL DEVICE, MANAGEMENT TERMINAL DEVICE, AND RADIO COMMUNICATION METHOD

(75) Inventors: Tomoya Urushihara, Tokyo (JP); Kentaro Miyano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1212 days.

(21) Appl. No.: 10/584,322

(22) PCT Filed: Oct. 26, 2005

(86) PCT No.: PCT/JP2005/019679

§ 371 (c)(1),
(2), (4) Date: Jun. 26, 2006

(87) PCT Pub. No.: WO2006/046546

PCT Pub. Date: May 4, 2006

(65) Prior Publication Data

US 2009/0054002 A1   Feb. 26, 2009

(30) Foreign Application Priority Data

Oct. 26, 2004   (JP)   ............................ 2004-310813
Oct. 25, 2005   (JP)   ............................ 2005-310039

(51) Int. Cl.
*H04B 1/00* (2006.01)
(52) U.S. Cl. ................. 455/63.1; 455/67.11; 455/67.13
(58) Field of Classification Search ............... 455/67.11, 455/67.13, 450–452.2, 63.1
See application file for complete search history.

(56) References Cited

U.S. PATENT DOCUMENTS 6,363,062 B1   3/2002   Aaronson

2003/0186713 A1   10/2003   Sugaya et al.
2003/0210665 A1   11/2003   Salmenkaita et al.
2004/0162093 A1 *   8/2004   Bevan et al. ................. 455/502

(Continued)

FOREIGN PATENT DOCUMENTS

JP   60239139   11/1985

(Continued)

OTHER PUBLICATIONS

PCT International Search Report dated Jan. 31, 2006.

(Continued)

*Primary Examiner*—Raymond S Dean
(74) *Attorney, Agent, or Firm*—Dickinson Wright PLLC

(57) ABSTRACT

Management terminal apparatus, wireless terminal apparatus, and a wireless communication method that reduces interference and improves communication quality under a communication environment where a plurality of wireless communication schemes are mixed. At management terminal apparatus (200), a wireless section (210) receives communication profile information from wireless terminal apparatus (100) and outputs this to communication permission generating section (220). The communication profile information may include information for a used wireless communication scheme, used frequency bandwidth, communication start time and communication continuation time, for wireless resources shared by a plurality of wireless communication schemes within the wireless communication system. Furthermore, wireless section (210) transmits communication permit/deny information to wireless terminal apparatus (100). Communication permission generating section (220) refers to communication profile information and communication permission history stored in storage section (230) and generates communication permit/deny information for communication of communication profile information. Storage section (230) stores communication permit/deny information as communication permission history.

11 Claims, 21 Drawing Sheets

U.S. PATENT DOCUMENTS

| | | |
|---|---|---|
| 2006/0057968 A1 | 3/2006 | Ohtani |
| 2006/0098592 A1* | 5/2006 | Proctor, Jr. et al. .......... 370/315 |
| 2006/0155856 A1 | 7/2006 | Nakashima |

FOREIGN PATENT DOCUMENTS

| | | |
|---|---|---|
| JP | 2001217759 | 8/2001 |
| JP | 2002-281544 | 9/2002 |
| JP | 2003-501941 | 1/2003 |
| JP | 2003258812 | 9/2003 |
| JP | 2003333054 | 11/2003 |
| JP | 2004007652 | 1/2004 |
| WO | 2004/039009 | 5/2004 |
| WO | 2004/064333 | 7/2004 |

OTHER PUBLICATIONS

Japanese Notice of the Reasons for Rejection dated Oct. 19, 2010.

* cited by examiner

RADIO TERMINAL DEVICE, MANAGEMENT TERMINAL DEVICE, AND RADIO COMMUNICATION METHOD

TECHNICAL FIELD

The present invention relates to a wireless terminal apparatus, management terminal apparatus and wireless communication method, and particularly relates to a wireless terminal apparatus, management terminal apparatus and wireless communication method for a wireless communication system for a management terminal apparatus managing wireless communication between wireless terminal apparatus under an environment where communication of a plurality of wireless communication schemes are mixed.

BACKGROUND ART

Conventionally, under an environment where communication is carried out between wireless terminal apparatus using only a single wireless communication scheme, a scheme which a management terminal apparatus manages allocation of channels to wireless terminal apparatus is proposed (for example, see Patent Document 1). FIG. 1 shows an example of a management scheme of channel allocation by management terminal apparatus. In the wireless communication system shown in the same drawing, a management terminal apparatus 10 to perform centralized management of channel usage conditions of the whole system is provided, and wireless terminal apparatus 20-1 notifies management terminal apparatus 10 of a communication request prior to carrying out communication with wireless terminal apparatus 20-2. Management terminal apparatus 10 then notifies wireless terminal apparatus 20-1 of information for usable channels that are different to channels already allocated to communication with wireless terminal apparatus 20-3 and wireless terminal apparatus 20-4, and wireless terminal apparatus 20-1 carries out communication with wireless terminal apparatus 20-2 using a usable channel. This prevents interference with the same channel within a wireless communication system.

On the other hand, for example, wireless LANs such as IEEE802.11a, IEEE802.11b and IEEE802.11g, PHS (Personal Handyphone System), Bluetooth (Bluetooth) or the like are already being implemented as wireless communication schemes used in relatively confined spaces such as homes, offices or the like. With spread of these wireless communication schemes, environments where a plurality of wireless communication schemes are mixed within home or office and a plurality of wireless terminal apparatus corresponding to these wireless communication schemes are mixed together have been increasing.

For example, in the event that wireless terminal apparatus carrying out communication using IEEE802.11b, IEEE802.11g and Bluetooth are mixed together, these wireless communication schemes use 2.4 GHz (Gigahertz) band and the possibility of interference occurring in mutual communication is therefore high.

Patent Document 1: Japanese Patent Application Laid-open No. 2003-333054.

DISCLOSURE OF INVENTION

Problems to be Solved by the Invention

Even in the event that a plurality of wireless terminal apparatus exist as described above and communication is carried out by means of a plurality of respectively different wireless communication schemes, a common wireless resources is used and it is important to reduce interference with other communications from viewpoint of communication quality.

However, under a communication environment where a plurality of wireless communication schemes are mixed as described above, there is no example of study of management terminal apparatus managing communication between wireless terminal apparatus, and this makes the reduction of interference under these kinds of communication conditions difficult, which causes a problem of falling communication quality.

Namely, for example, in the management terminal apparatus disclosed in Patent Document 1 described above, only channel usage conditions under a communication environment where a single wireless communication scheme exists are managed and communication conditions for communication by other different wireless communication schemes therefore cannot be understood.

It is therefore an object of the present invention to provide wireless terminal apparatus, management terminal apparatus and wireless communication apparatus capable of reducing interference and improving communication quality under a communication environment where a plurality of wireless communication schemes are mixed.

Means for Solving the Problem

The management terminal apparatus according to the present invention adopts a configuration having an information acquiring section acquiring communication profile information containing information for a wireless communication scheme, used frequency bandwidth, communication start time, and communication duration time used by a communication party with another wireless terminal apparatus, a generating section comparing the communication profile information and past communication permission history, and generating communication permit/deny information indicating communication permission or denial in accordance with the communication profile information, and a transmission section transmitting generated communication permit/deny information to the wireless terminal apparatus.

The wireless terminal apparatus according to the present invention adopts a configuration having a generating section generating communication profile information containing information for a wireless communication schemes, used frequency bandwidth, communication start time, and/or a communication continuation time corresponding to a communication request in the event that the communication request occurs with other wireless terminal apparatus, and a transmission section transmitting generated communication profile information to the management terminal apparatus.

A wireless communication system according to the present invention adopts a configuration where a wireless communication system having a plurality of wireless terminal apparatus and management terminal apparatus where the wireless terminal apparatus comprises a generating section generating communication profile information containing information for a wireless communication scheme, used frequency bandwidth, communication start time, and/or a communication continuation time corresponding to a communication request in the event that the communication request occurs with another wireless terminal apparatus, and a transmission section transmitting generated communication profile information to the management terminal apparatus, and the management terminal apparatus comprises a receiving section receiving the communication profile information from the wireless terminal apparatus, a generating section comparing the received communication profile information and past communication permission history, and generating communication permit/deny information indicating communication permission or denial in accordance with the communication profile information, and a transmission section transmitting generated communication permit/deny information to the wireless terminal apparatus.

A wireless communication method according to the present invention adopts a configuration where the wireless communication method for a wireless communication system having a plurality of wireless terminal apparatus and management terminal apparatus, comprises the steps of the wireless terminal apparatus generating communication profile information containing information for a wireless communication scheme, used frequency bandwidth, communication start time, and/or a communication continuation time corresponding to a communication request in the event that the communication request occurs with another wireless terminal apparatus, the wireless terminal apparatus transmitting the generated communication profile information, the management terminal apparatus acquiring communication profile information containing information for a wireless communication scheme, used frequency bandwidth, communication start time, and communication continuation time corresponding to a communication request corresponding to the communication request, the management terminal apparatus comparing the acquired communication profile information and past communication permission history, and generating communication permit/deny information indicating communication permission or denial in accordance with the communication profile information, and the management terminal apparatus transmitting generated communication permit/deny information to the wireless terminal apparatus.

According to this, the management terminal apparatus acquires communication profile information and transmits communication permit/deny information generated from the results of comparing communication profile information and past communication permission history to wireless terminal apparatus. As a result, in the event that competition for wireless resources occurs, the management terminal apparatus changes communication profile information or denies start of communication, and it is possible to reduce interference and improve communication quality under a communication environment where a plurality of wireless communication schemes are mixed.

ADVANTAGEOUS EFFECT OF THE INVENTION

According to the present invention, it is possible to reduce interference and improve quality under a communication environment where a plurality of wireless communication methods are mixed.

BEST MODE FOR CARRYING OUT THE INVENTION

Now, embodiment of the present invention will be explained in detail with reference to the attached drawings.

Embodiment 1

In Embodiment 1 of the present invention, a plurality of wireless terminal apparatus within a relatively confined space such as, for example, in the homes, and a communication environment where communication links produced by a plurality of wireless communication schemes (for example, wireless communication schemes conforming to standards such as IEEE802.11a, IEEE802.11b, IEEE802.11g, Bluetooth, PHS or the like) are mixed between these wireless terminal apparatus is assumed. In particular, a communication environment where communication links by means of wireless communication schemes using the same frequency bandwidths such as, for example, IEEE802.11b, IEE802.11g and Bluetooth are mixed is assumed.

Figure 2:
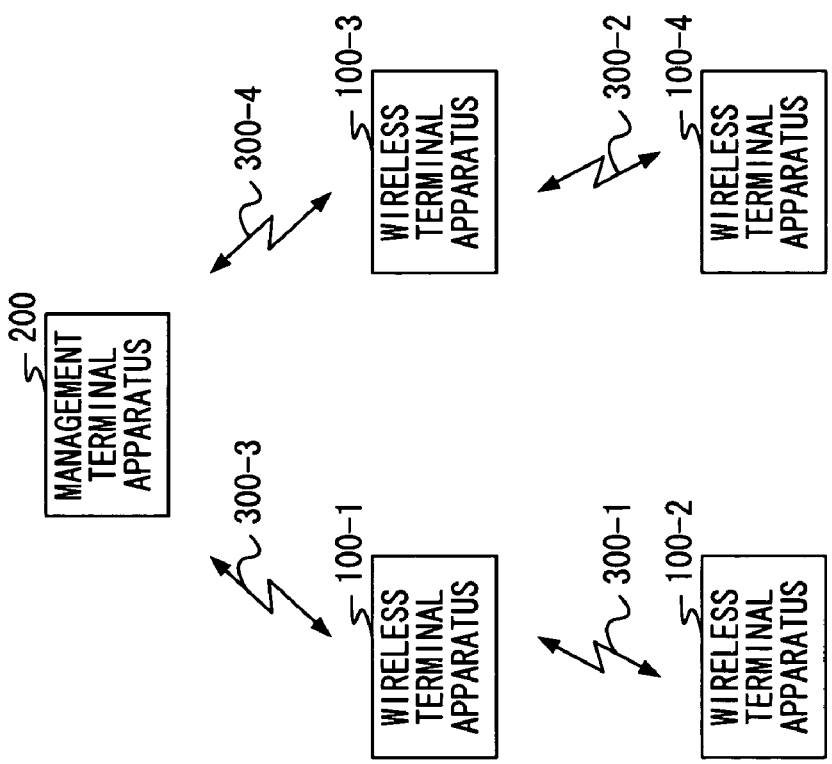
FIG. 2 is a figure showing an example of a wireless communication system according to Embodiment 1 of the present invention.

FIG. 2 is a figure showing an example of a wireless communication system according to this embodiment. As shown in the same drawing, a wireless communication system according to this embodiment includes wireless terminal apparatus 100-1, wireless terminal apparatus 100-2, wireless terminal apparatus 100-3, wireless terminal apparatus 100-4 and management terminal apparatus 200.

In this embodiment, it is taken that wireless terminal apparatus 100-1 and wireless terminal apparatus 100-2 carry out wireless communication via IEEE802.11g communication link 300-1, and wireless terminal apparatus 100-3 and wireless terminal apparatus 100-4 carry out wireless communication via Bluetooth communication link 300-2. Then, wireless terminal apparatus 100-1 notifies management terminal apparatus 200 of communication with wireless terminal apparatus 100-2 via communication link 300-3 by IEEE802.11a, and wireless terminal apparatus 100-3 notifies management terminal apparatus 200 of communication with wireless terminal apparatus 100-4 via communication link 300-4 by IEEE802.11a.

The wireless communication scheme of each communication link 300-1 to 300-4 is not limited to that described above, but the wireless communication scheme of both the communication link 300-1 and communication link 300-2 may be the same or different, and it is taken that the wireless communication scheme of communication link 300-3 and communication link 300-4 does not influence the wireless communication scheme of communication link 300-1 and communication link 300-2. It is therefore preferable for the wireless communication scheme of communication link 300-3 and 300-4 to be different to the wireless communication schemes of both the communication link 300-1 and the communication link 300-2. However, for example, an antenna may be provided separately per communication link and set so that each antenna beam does not over lap or the antennas may be switched over according to necessary, or communication of communication link 300-3 and communication link 300-4 may be carried out using dedicated channels or at dedicated timings. It is also desirable for the wireless communication schemes of communication link 300-3 and communication link 300-4 to be mutually different.

The wireless communication scheme for these communication links may also be decided in advance every wireless communication system. In addition, ultra wide band transmission schemes such as IEEE802.11b, PHS, specified low power wireless and UWB (Ultra Wide Band), and infra-red wireless communication or the like also exist as schemes that may be adopted as a wireless communication scheme. Preferably, the case is given where communication link 300-1 is taken to be Bluetooth, communication link 300-2 is taken to be specified low power wireless, and communication links 300-3 and 300-4 are taken to be IEEE802.11a, or communication link 300-1 is taken to be IEEE802.11b, communication link 300-2 is specified low power wireless, and communication link 300-3 and 300-4 are taken to be IEEE802.11a, or communication link 300-1 is taken to be Bluetooth, communication link 300-2 is taken to be specified lower power wireless, and communication links 300-3 and 300-4 are taken to be PHS, or communication link 300-1 is taken to be 802.11b communication link 300-2 is taken to be specified lower power wireless, and communication links 300-3 and 300-4 are taken to be PHS.

Figure 3:
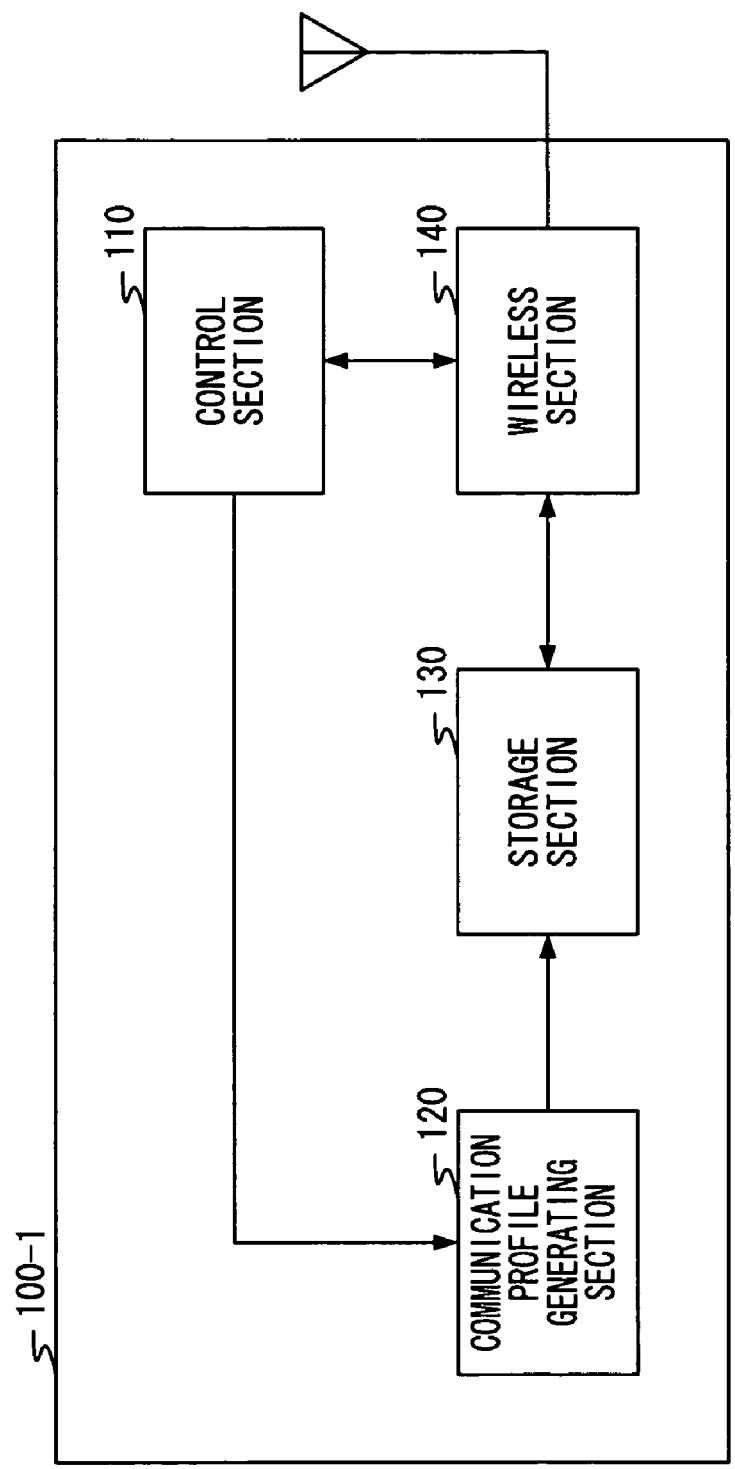
FIG. 3 is a block diagram showing a configuration of principal parts of a wireless terminal apparatus according to Embodiment 1.

FIG. 3 is a block diagram showing a configuration of principal parts of wireless terminal apparatus 100-1 of this embodiment. Wireless terminal apparatus 100-2 to 100-4 also have the configuration shown in FIG. 3. As shown in FIG. 3, wireless terminal apparatus 100-1 includes control section 110, communication profile generating section 120, storage section 130, and wireless section 140.

Control section 110 instructs switching of the wireless communication scheme to wireless section 140 and instructs generation of communication profile information to communication profile generating section 120. Communication profile information will be described later.

Communication profile generating section 120 generates communication profile information relating to communication with wireless terminal apparatus 100-2 in accordance with instructions from control section 110 and outputs this information to storage section 130.

Here, communication profile information is information indicating profile information relating to communication of communication link 300-1 and communication link 300-2 such as, for example, wireless communication scheme to use, used frequency bandwidth, used channel, communication start time, communication continuation time, modulation scheme, encoding rate, transmission power, uplink and downlink communication ratio, transmission source MAC (Media Access Control) address, destination MAC address, communication priority or the like. An IP address allocated to the wireless terminal apparatus or a serial number corresponding to a manufacturer number may also be used as information included in the communication profile information in place of the transmission source MAC address and destination MAC address. Furthermore, it is not necessary to individually specify wireless terminal apparatus, and the product number or the like may be used in the case where it is sufficient to specify simply the product type.

Communication profile information includes information relating to wireless resources, of wireless resources shared by the plurality of wireless communication schemes within the wireless communication system, required by each communication link. The communication profile information therefore includes at least information for the wireless communication scheme to use, the used frequency bandwidth, communication start time, and communication continuation time. Furthermore, it is preferable for communication profile information to include at least one of information for the modulation scheme, encoding rate, transmission power and spreading factor.

Information determined by the wireless communication scheme specification is obvious if information for the wireless communication scheme is included in the communication profile and it is therefore not necessary to include information determined by the specification in the communication profile information. Namely, in this case, it is sufficient to include information for the wireless communication scheme to use, used frequency bandwidth, the communication start time and the communication continuation time in the communication profile information for transmission required to be acquired at management terminal apparatus 200. As a result, it is possible to reduce the amount of information for the communication profile information.

Furthermore, it is also desirable for the information contained in the communication profile information to be different depending on the wireless communication schemes for communication link 300-1 and communication link 300-2. Namely, in the case where, for example, IEEE802.11a or IEEE802.11g is used as the wireless communication scheme, FFT (Fast Fourier Transform) point number, sub-carrier number, modulation scheme per sub-carrier, encoding rate per sub-carrier or the like may be included in the communication information, and in the case that Bluetooth is used as the wireless communication or the like, a frequency hopping pattern or the like may be included in the communication profile information.

Furthermore, it is also possible to only generate a trigger signal giving notification of a communication request instead of the communication profile information, and then hold the actual body of information for management terminal apparatus 200 in advance in, for example, storage section 230, or download the actual body of information via the Internet or the like. Namely, it is possible for communication permission generating section 220 (described later) to acquire communication profile information using any method. In this event, it is necessary to register communication profile information for communication link 300-1 and communication link 300-2 in advance in storage section 230 or outside, but this makes it possible to further reduce the amount of information transmitted by communication link 300-3 and communication link 300-4.

Storage section 130 stores information necessary for configuring wireless section 140 according to each wireless communication scheme and communication profile information outputted by communication profile generating section 120.

Wireless section 140 has an antenna compatible with the wireless communication scheme (i.e. IEEE802.11g) of communication link 300-1 and the wireless communication scheme (i.e. IEEE802.11a) of communication link 300-3, and is configured using a programmable device capable of being re-configured by, for example, re-writing of software or the like. Here, programmable device is one of, or a combination of two or more of, for example, an FPGA (Field Programmable Gate Array), DSP (Digital Signal Processor), CPU (Central Processing Unit) and reconfigurable processor or the like. As a result, the wireless section 140 is capable of switching between configurations compatible with a wireless communication scheme (i.e. IEEE802.11g) of communication link 300-1 and a wireless communication scheme (i.e. IEEE802.11a) of communication link 300-3.

Wireless section 140 transmits data to wireless terminal apparatus 100-2 via communication link 300-1 and transmits communication profile information to management terminal apparatus 200 via communication link 300-3. Furthermore, wireless section 140 receives communication permit/deny information transmitted from management terminal apparatus 200. It is also possible for the wireless section 140 to be configured from a plurality of wireless sections with each wireless communication scheme provided independently rather than being configured using a programmable device.

Figure 4:
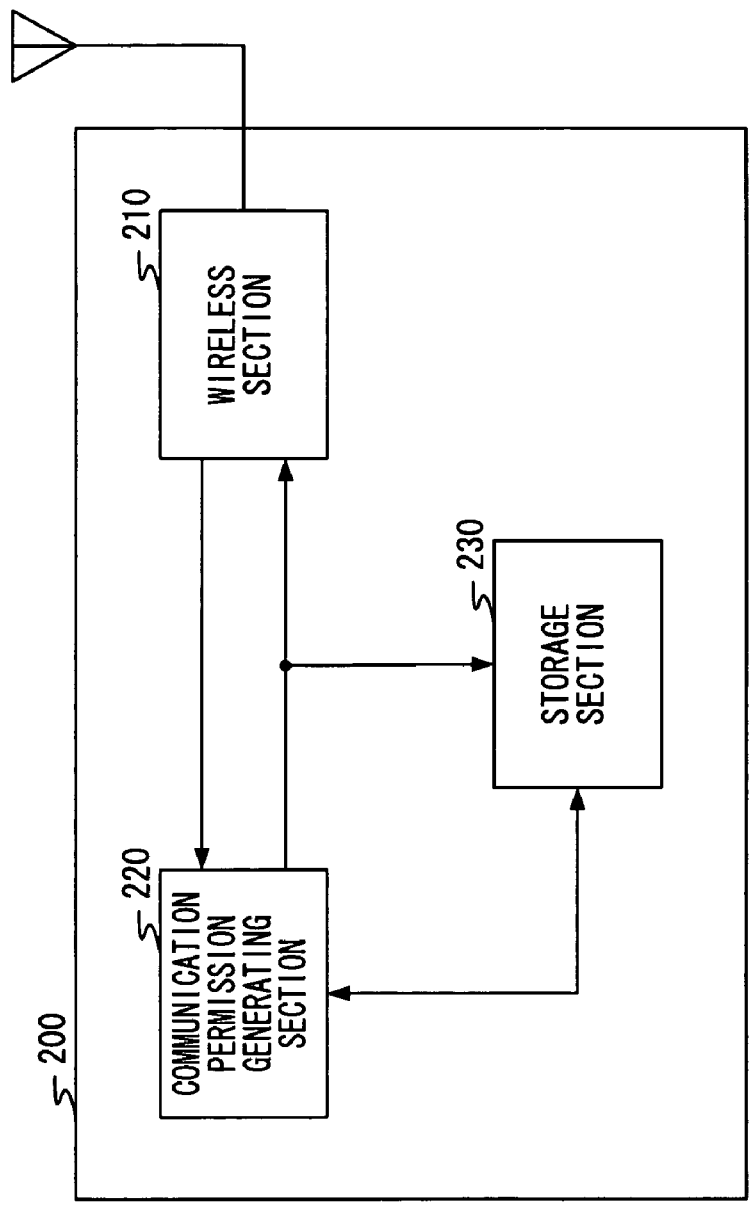
FIG. 4 is a block diagram showing a configuration of principal parts of a management terminal apparatus according to Embodiment 1.

FIG. 4 is a block diagram showing a configuration of principal parts of management terminal apparatus 200 according to this embodiment. As shown in FIG. 4, management terminal apparatus 200 has wireless section 210, communication permission generating section 220 and storage section 230.

Wireless section 210 has an antenna compatible with the wireless communication scheme (i.e. IEEE802.11a) of communication link 300-3 and communication link 300-4, receives communication profile information transmitted from wireless terminal apparatus 100-1 and wireless terminal apparatus 100-3 and outputs this to communication permission generating section 220. Furthermore, wireless section 210 transmits communication permit/deny information generated by communication permission generating section 220 described later.

Communication permission generating section 220 refers to communication profile information outputted by wireless section 210 and communication permission history stored in storage section 230, generates communication permit/deny information indicating whether or not to permit communication carrying out at communication link 300-1 and communication link 300-2, and outputs this communication permit/deny information to wireless section 210 and storage section 230.

Here, communication permit/deny information is the same information as the communication profile information described above with communication permit/deny information indicating whether or not communication indicated by the communication profile information is possible added. Communication permit/deny information may be added as, for example, ACK if communication is possible, and NACK if communication is not possible.

Communication permit/deny information may also not include the same information as the communication profile information, but rather include only ACK or NACK as the communication permit/deny information. In this event, the communication permit/deny information is taken to be ACK in the event that communication displayed by the communication profile information is possible and communication permit/deny information is taken to be NACK in the event that communication is not possible without any changes to the communication added to communication displayed by the communication profile information. Furthermore, in the event that communication displayed by the communication profile information is possible, it is also possible for no information at all to be generated. In this case, if communication permit/deny information is not received even if a predetermined time has elapsed, wireless terminal apparatus 100-1 starts communication indicated by the communication profile information.

Storage section 230 stores communication permit/deny information generated by communication permission generating section 220 as communication permission history.

Next, the operation of wireless terminal apparatus 100-1 and management terminal apparatus 200 configured in the above manner will be explained in detail with reference to the sequence drawing shown in FIG. 5A and FIG. 5B. In the following explanation, it is taken that wireless terminal apparatus 100-3 and wireless terminal apparatus 100-4 have already started to communicate using Bluetooth via communication link 300-2. Communication permission history for communication corresponding to communication profile information generated by communication profile generating section 120 of wireless terminal apparatus 100-3 is therefore stored at storage section 230 of management terminal apparatus 200. As this communication permission history, it is taken that information of, for example, a wireless communication scheme of Bluetooth, a modulation scheme of GFSK, an encoding rate of ⅔, transmission power of 1 mW (milliwatt), a used frequency bandwidth of 79 MHz (Megahertz), a used channel (center frequency) of 2441 MHz, a communication start time of one second, and a communication continuation time of five seconds is stored.

Furthermore, in the following explanation, communication profile information generated by wireless terminal apparatus 100-1 is taken to include wireless communication scheme, modulation scheme, encoding rate, transmission power, used frequency bandwidth, used channel (center frequency), communication start time and communication continuation time. A communication request at communication link 300-1 by wireless terminal apparatus 100-1 occurs two seconds after the occurrence of a request at communication link 300-2 described above, and the communication profile information relating to communication link 300-1 is then taken to be a wireless communication scheme of IEEE802.11g, a modulation scheme of 64QAM, an encoding rate of ¾, transmission power of 10 mW, a used frequency band width of 16.6 MHz, an used channel (center frequency) of 2412 MHz, a communication start time of two seconds and a communication continuation time of three seconds.

The time taken for from a transmission request to occur at wireless terminal apparatus 100-1 and wireless terminal apparatus 100-3, communication profile information to be transmitted to the management terminal 200, to communication permit/deny information to be received from management terminal 200 is taken to be sufficiently short compared to the communication start time and communication continuation time.

First, when a communication request occurs at control section 110 of wireless terminal apparatus 100-1 (401), an instruction to switch over to a configuration corresponding to the wireless communication scheme (i.e. IEEE802.11a) of communication link 300-3 is outputted from control section 110 to wireless section 140 (402). At the same time, a communication profile information generation instruction is outputted from control section 110 to communication profile generating section 120 (403).

Communication profile information relating to communication occurring at communication link 300-1 is then generated by communication profile generating section 120 (404). Specifically, communication profile information containing information to the effect that the wireless communication scheme is IEEE802.11g, the modulation scheme is 64QAM, the encoding rate is ¾, the transmission power is 10 mW, the used frequency bandwidth is 166 MHz, the used channel (center frequency) is 2412 MHz, the communication start time is two seconds, and the communication continuation time is three seconds is generated.

In the generation of this communication profile information, that relating to what is determined by the specification is set as specified in the specification. Namely, for example, when the wireless communication scheme is Bluetooth, it is taken that the used frequency bandwidth is 79 MHz and the used channel (center frequency) is 2441 MHz. Furthermore, regarding the communication continuation time, a predetermined time may be decided every time a communication request occurs or may be decided using system parameters relating to frame length data. Moreover, communication continuation time may also be obtained from the amount of data intended to transmit and the transmission rate decided by the specification or the like. Communication profile information generated in this way is then outputted to storage section 130 (405), and stored by storage section 130 (406).

On the other hand, wireless section 140 reads out configuration information for the wireless communication scheme (IEEE802.11a) for communication link 300-3 and communication profile information relating to communication link 300-1 from storage section 130 in accordance with instructions from control section 110 (407), and switches over to a configuration corresponding to IEEE802.11a (408). After this, transmission data conforming to the specification of IEEE802.11a and containing the communication profile information is generated by wireless section 140 (for example, communication profile information is stored within a frame body field of a data frame). The transmission data is then subjected to predetermined transmission processing such as convolution encoding, OFDM modulation, orthogonal transformation, frequency conversion, filter processing, amplification or the like by wireless section 140 in accordance with the communication specification and procedure of IEEE802.11a (409) and is transmitted from the antenna to management terminal apparatus 200 (410).

The transmission data is then received by wireless section 210 of management terminal apparatus 200. This received signal is then subjected to predetermined reception processing of IEEE802.11a by wireless section 210 (411) and communication profile information is obtained. Specifically, the received signal from wireless terminal apparatus 100-1 is subjected to predetermined reception processing such as amplification, filter processing, frequency conversion, orthogonal detection, OFDM demodulation, Viterbi decoding or the like in accordance with the specification of IEEE802.11a. The communication profile information can then be obtained by extracting data of the body field portion of the frame from the received signal after reception processing. Communication profile information is then outputted to communication permission generating section 220 (412).

The communication permission history (communication permission history relating to communication of communication link 300-2 that has already started) stored on storage section 230 is then referred to by communication permission generating section 220 (413), and it is then determined whether or not communication occurring at communication link 300-1 is possible by comparing the communication permission history and the communication profile information. Namely, it is determined whether or not there is duplication in wireless resources used by communications (in this case, communication of communication link 300-2) stored as communication permission history and wireless resources used by communications (in this case, communication of communication link 300-1) indicated in the communication profile information.

In the event that the results of this determination are determined that communication of the communication link 300-1 indicated by the communication profile information is possible, communication permit information with ACK added to the communication profile information as communication permit/deny information is generated (414).

Conversely, in the event that it is determined that communication of the communication link 300-1 indicated by the communication profile information is not possible, information relating to wireless resources overlapping with communications stored as communication permission history of each information contained in the communication profile information is updated, and communication permit information with ACK added is generated (414). In the event that, for example, information relating to communication priority is included in the communication permission history and the communication profile information, communication of the communication link 300-2 that has already started may be interrupted according to importance.

Further, in the event that communication is not possible even if information contained in the communication profile information is changed, communication deny information with NACK added as communication permission information to the communication profile information is generated (414). In the event that there is no communication which has already started within the wireless communication system, communication permission history is not stored in storage section 230, but, at this time, it is determined that communication indicated by communication profile information is possible, communication permit information is generated, and communication profile information is stored in storage section 230 as communication permission history. The generation of communication permit/deny information by communication permission generating section 220 will be described later.

When communication permit/deny information is generated, the communication permit/deny information is outputted to wireless section 210 (415), and at the same time, communication permit/deny information is also outputted to storage section 230 (416) and stored as communication permission history. At this time, by storing history of the corresponding communication profile information together with the communication permission history, it is possible for management terminal apparatus 200 to understand the frequency of communication requests from each wireless terminal apparatus and information relating to communication content and it is therefore possible to carry out effective processing based on this communication profile information history. Namely, for example, control is possible where fixed wireless resources are allocated in advance to communications where communication request frequency is high. Furthermore, control is also possible where wireless resources are allocated in advance to communications for which communication requests occur periodically, in accordance with the period.

Transmission data conforming to the specification of IEEE802.11a containing the communication permit/deny information is then generated by wireless section 210, the transmission data is subjected to predetermined processing such as convolution encoding, OFDM modulation, orthogonal modulation frequency modulation or the like, in accordance with the communication specification and procedures of IEEE802.11a (417), and the transmission data is transmitted from the antenna to wireless terminal apparatus 100-1 (419).

The transmission data is then received by wireless section 140 of wireless terminal apparatus 100-1. This received signal is then subjected to predetermined reception processing of IEEE802.11a by wireless section 140 (420) and communication permit/deny information is obtained. If the communication permit/deny information contained in the communication permit/deny information is ACK, notification indicating received of the communication permit information is outputted to control section 110, and if the communication permit/deny information is NACK, notification indicating the receipt communication deny information is outputted to control section 110 (421). In the event that the communication permit/deny information is NACK, namely, in the event that communication deny information is received, after a predetermined time has elapsed, the communication profile information generation/transmission processing described above is carried out again. Here, the explanation is continued taking that the communication permit/deny information is ACK, namely, communication permit information is received.

When notification indicating that communication permit information is outputted to control section 110, an instruction to switch over to a configuration corresponding to the wireless communication scheme (i.e. IEEE802.11g) of communication link 300-1 is outputted from control section 110 to wireless section 140 (422). Wireless section 140 then reads out configuration information for the wireless communication scheme (IEEE802.11g) of communication link 300-1 from storage section 130 in accordance with this instruction (423), and switches over to a configuration corresponding to IEEE802.11g (424).

After this, communication is started using IEEE802.11g by wireless section 140 based on the modulation scheme, encoding rate, transmission power and communication continuation time displayed by the communication permit information (425). Communication of communication link 300-1 using IEEE802.11g does not use wireless resources overlapping with communication of communication link 300-2 using Bluetooth, and it is therefore possible to reduce interference and improve communication quality under a communication environment where a plurality of wireless communication schemes are mixed.

Figure 6:
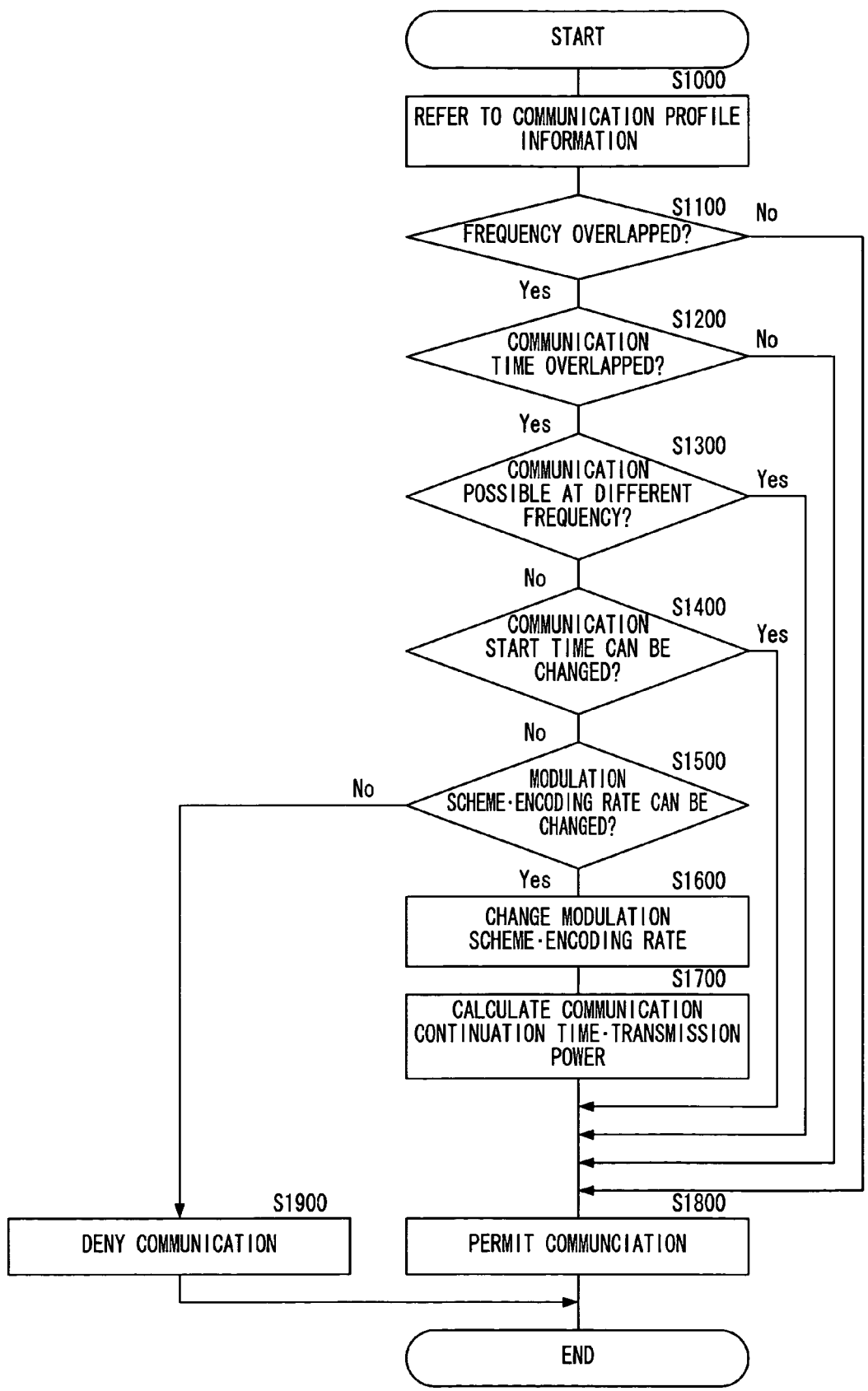
FIG. 6 is a flow diagram showing an operation for generating communication permit/deny information according to Embodiment 1.

Next, generation of communication permit/deny information by communication permission generating section 220 of management terminal apparatus 200 will be explained with reference to the flow diagram shown in FIG. 6.

At communication permission generating section 220, first, communication profile information received at wireless section 210 (communication profile information of communication link 300-1) and communication permission history stored in storage section 230 (communication permission history of communication link 300-2) are referred (S1000). It is then determined whether or not the spectrum for the communication permission history communication and the spectrum for the communication of the communication profile information overlap on the frequency axis (S1100).

Figure 7:
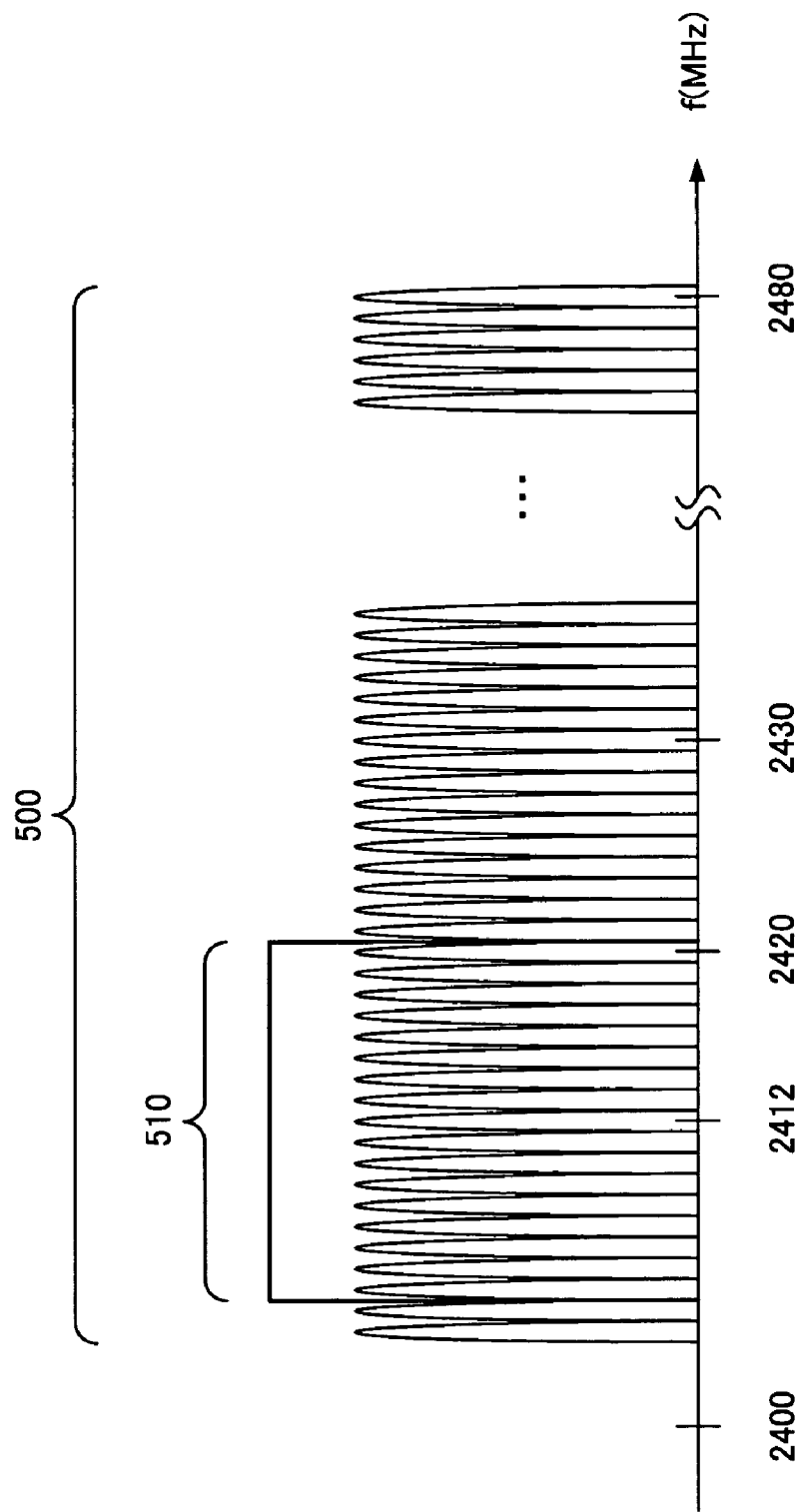
FIG. 7 is a figure showing an example of a communication spectrum for communication permission history and communication profile information according to Embodiment 1.

If the result of the determination is that there is no overlapping on the frequency axis, it is determined that communication indicated by the communication profile information is possible, and as described above, communication permit information with ACK added is generated at the communication profile information (S1800). On the other hand, as shown in FIG. 7, for example, in the event that communication spectrum 500 of the communication permission history relating to communication link 300-2 and communication spectrum 510 of communication profile information relating to communication link 300-1 overlap, it is determined that overlapping takes place on the frequency axis, and it is then determined whether or not it is possible to change the used channel at the communication profile information (S1200).

If the result of the determination is that change of the used channel is possible, the used channel for the communication profile information is changed to a channel for which communication is possible, and communication permit information with ACK added at the communication profile information after the change is generated (S1800). On the other hand, for example, in the event that Bluetooth is used for the communication for the communication permission history relating to communication link 300-2 and IEEE802.11g is used in the communication of the communication profile information relating to communication link 300-1, the usable bandwidth of IEE802.11g overlaps completely with the used frequency bandwidth of Bluetooth, and it is therefore determined that communication is not possible even if the used channel of the communication profile information is changed. In this event, it is determined by communication permission generating section 220 whether or not communication time of communication of communication permission history and communication time of communication of communication profile information overlaps on the time axis (S1300).

Figure 8:
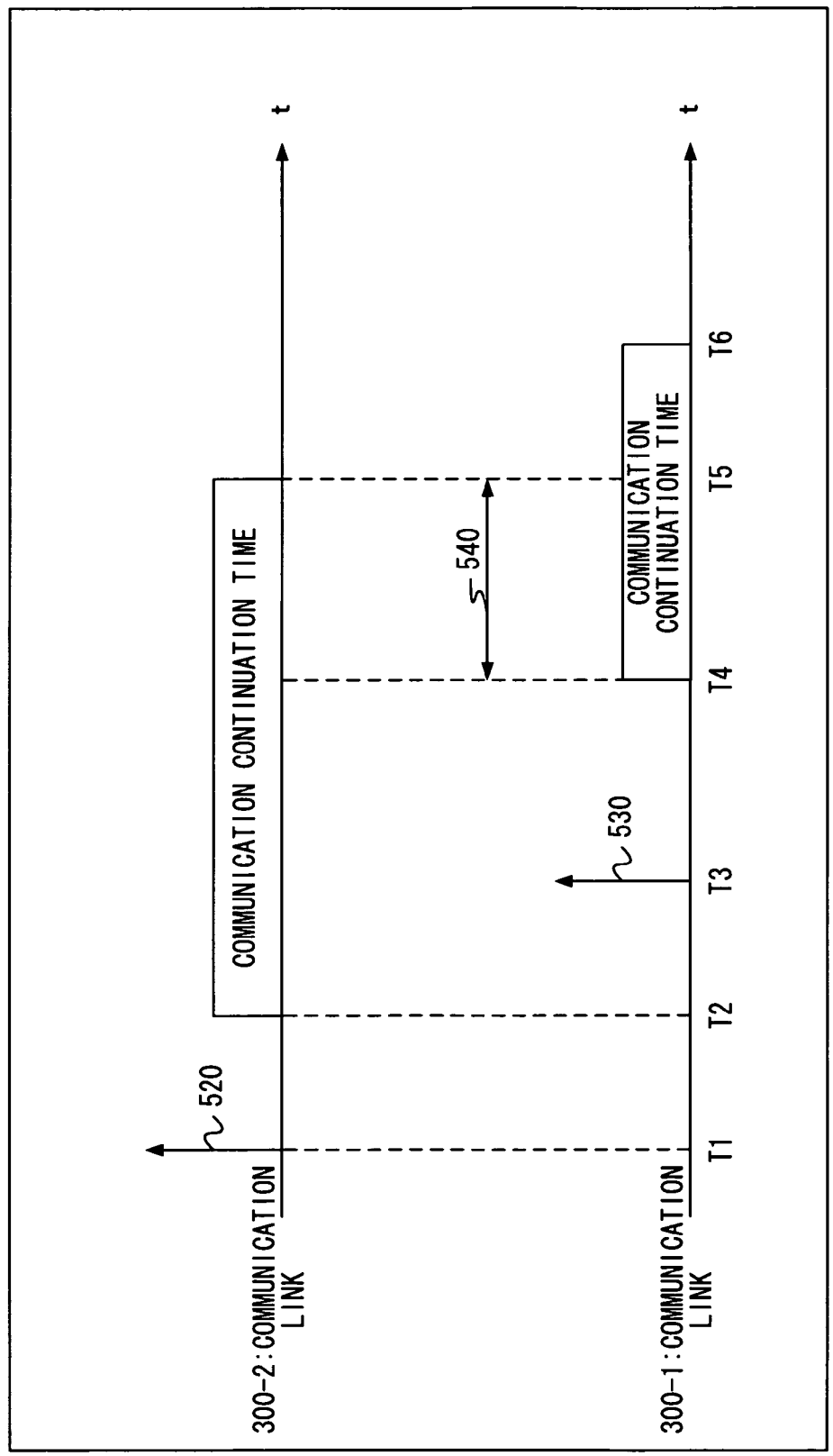
FIG. 8 is a figure showing an example of communication time for communication permission history and communication profile information according to Embodiment 1.

If the result of the determination is that there is no overlapping on the time axis, it is determined that communication indicated by the communication profile information is possible, and communication permit information with ACK added is generated at the communication profile information (S1800). On the other hand, for example, as shown in FIG. 8, in the event that communication of communication link 300-1 is scheduled to continue from time $T_4$ to time $T_6$ according to a communication request 530 occurred at time $T_3$ with respect to continuation of communication of communication link 300-2 from time $T_2$ to time $T_5$ according to communication request 520 occurred at time $T_1$, it is determined that overlapping time 540 occurs, and it is determined whether or not it is possible to change the communication start time of the communication profile information (S1400). The order of the determination of whether or not the frequencies overlap (S1100), the determination of whether or not communication is possible at another frequency (S1200), the determination of whether or not communication times overlap (S1300) and the determination of whether or not it is possible to change the communication start times (S1400) is not limited to this, and the order of this processing may be changed, providing that the conditions of the determination of whether or not the frequencies overlap (S1100) being before the determination of whether or not communication is possible at another frequency (S1200), and the determination of whether or not the communication times overlap (S1300) being before the determination of whether or not it is possible to change the communication start times (S1400) are satisfied.

If the result of the determination is that change of the communication start times is possible, the communication start time of the communication profile information is changed to a time where communication is possible, and communication permit information with ACK added to the communication profile information after the change is generated (S1800). On the other hand, in the event that it is determined that change of the communication start time is not possible, a determination is made as to whether or not change of the modulation scheme and encoding rate in the communication profile information is possible by communication permission generating section 220 (S1500).

If the result of the determination is that change of both the modulation scheme and encoding rate is possible, the modulation scheme and encoding rate of the communication profile information are changed (S1600), communication continuation time and transmission power corresponding to the changed modulation scheme and encoding rate are calculated (S1700), and the communication continuation time and transmission power of the communication profile information are changed to those calculated. Communication permit information with ACK added to the communication profile information after the change is then generated (S1800). Furthermore, if change of only one of the modulation scheme and encoding rate is possible, whichever information of the communication profile information that can be changed is changed (S1600), communication continuation time and transmission power corresponding to the changed modulation scheme or encoding rate is calculated (S1700), and the communication continuation time and transmission power of the communication profile information is changed to those calculated. Communication permit information with ACK added to the communication profile information after the change is then generated (S1800).

Here, calculation of communication continuation time and transmission power calculation with change in the modulation scheme and encoding rate will be explained.

Figure 9:
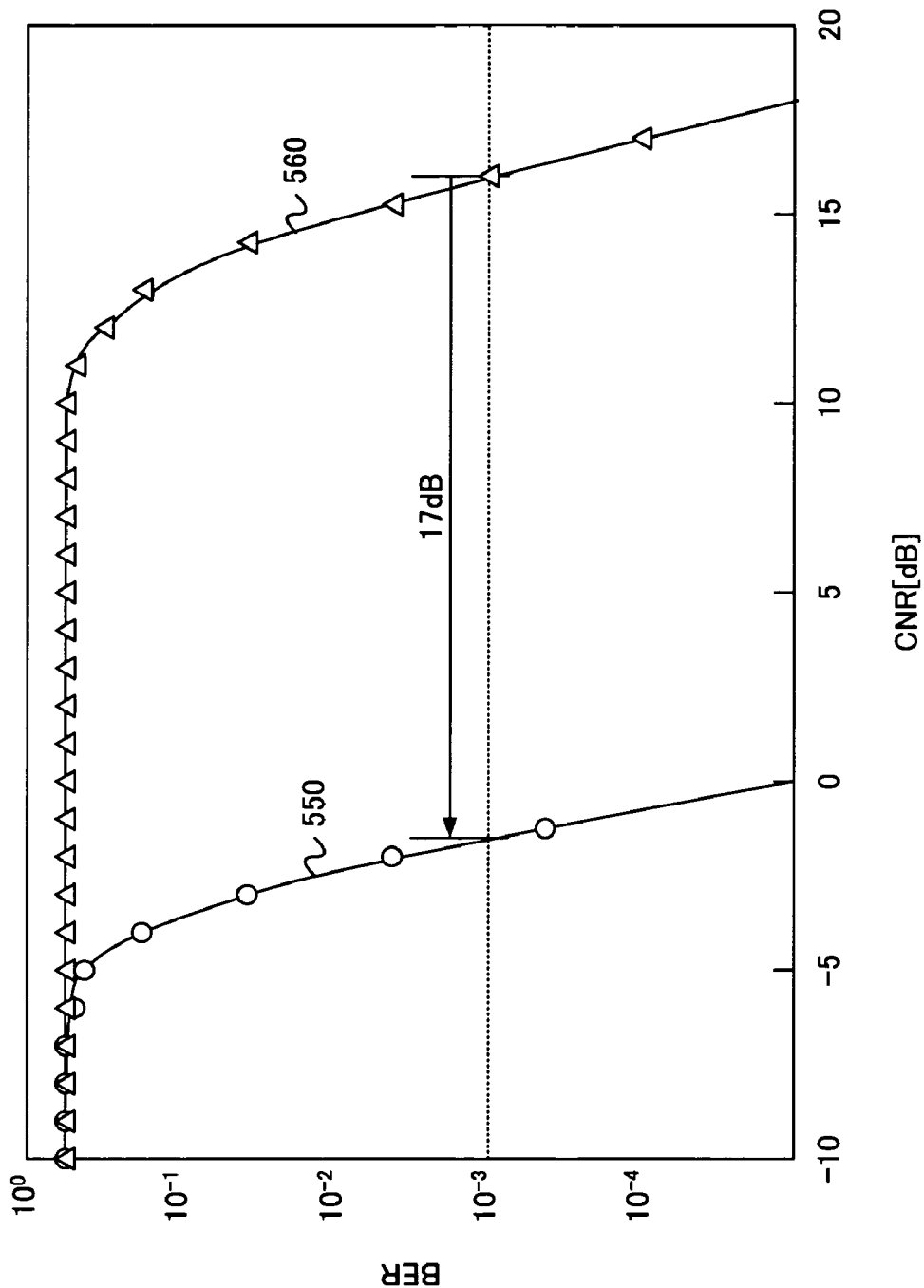
FIG. 9 is a figure showing an example of a reception CNR versus BER characteristic.

As an example, it is taken that, for example, the modulation scheme can be changed from 64QAM to BPSK and the encoding rate can be changed from ¾ to ½. FIG. 9 is a figure showing a reception CNR versus BER characteristic for before and after changing of the modulation scheme and encoding rate in the case where the wireless communication scheme is IEEE802.11g. Namely, characteristic curve 550 shows the characteristic curve after changing (modulation scheme: BPSK, encoding rate: ½), and characteristic curve 560 shows the characteristic curve before changing (modulation scheme: 64QAM, encoding rate ¾).

As shown in the same drawing, in IEEE802.11g, by changing the modulation scheme from 64QAM to BPSK and the encoding rate from ¾ to ½, a gain of approximately 17 dB can be obtained taking the case of a BER of $10^{-3}$ as a reference. By making the transmission power for communication link 300-1 10 dB smaller than 10 mW at 1 mW, it is possible to suppress the influence of interference on communication of communication link 300-2 carried out at overlapping times while maintaining the BER characteristic of communication link 300-1. Furthermore, as a gain of 7 (=17−10) dB is obtained, it is possible to suppress the influence of interference from communication of communication link 300-2 and carry out communication while suppressing the influence of mutual interference.

At this time, it is possible to change the continuation time by changing the modulation scheme and encoding rate. Namely, by changing the modulation scheme from 64QAM to BPSK, the transmission rate becomes ⅙ times and the encoding rate changes from ¾ to ½, so that the transmission rate becomes ⅔ times. This means that nine (=6×(3/2)) times the time of the communication continuation time shown in the communication profile information is necessary. In this way, the necessary communication continuation time and transmission power with change of the encoding rate and modulation scheme is calculated, and each item of information of the communication profile information is changed.

Referring again to FIG. 6, if the results of the determination of S1500 are that change of either of the modulation scheme and the encoding rate is not possible, it is determined that communication of communication link 300-1 displayed in the communication profile information is not possible, and communication deny information with NACK added to the communication profile information is generated (S1900).

Communication permit/deny information generated in this way is transmitted to wireless terminal apparatus 100-1, and communication of communication link 300-1 is started in such a manner as not to interfere with communication of communication link 300-2.

In this way, according to this embodiment, whether or not competition for wireless resources is occurring for the management terminal apparatus at another communication link is determined based on communication profile information relating to the communication link generating the communication request, and in the event that competition for wireless resources occurs, by changing communication profile information or denying start of communication, it is therefore possible to reduce interference and improve communication quality under a communication environment where a plurality of wireless communication scheme are mixed.

In this embodiment, management terminal apparatus 200 is notified of communication profile information only before starting communication with each wireless terminal apparatus, but it is also possible for the management terminal apparatus 200 to be notified of information relating to communication results after communication with each wireless terminal apparatus is complete. Information relating to communication results may be a Received Signal Strength Indicator (RSSI), Signal to Noise Ratio (SNR), Carrier to Noise Ratio (CNR), bit error rate, frame error rate, received signal frequency characteristic or the like. In this way, management terminal apparatus 200 is capable of understanding communication results and propagation path characteristics of each wireless communication link and it is possible to carry out more appropriate control.

Moreover, communication of communication links 300-3 and 300-4 is not limited to wireless communication, and, for example, wired communication such as electrical light wave communication, Ethernet (registered trademark) or the like may also be used for this communication. As a result, it is possible to reduce the influence of communication of communication links 300-3 and 300-4 on communication of communication links 300-1 and 300-2.

Furthermore, it is also possible to provide an output section outputting communication profile information, communication permission history or the like to other processing sections or equipment and provide an input section inputting signals from outside at management terminal apparatus 200. As a result, it is possible to output communication profile information, communication permission history or the like from the output section to external equipment such as a personal computer, television, printer or the like, to notify a user of information for communication conditions and to have a user allocate ad select communication permit/deny information via the input section.

Moreover, in this embodiment, a configuration is adopted where communication permit/deny information is transmitted from management terminal apparatus 200 only to wireless terminal apparatus 100-1 notifying of communication profile information, but it is also possible to adopt a configuration where communication permit/deny information is transmitted to all of the wireless terminal apparatus 100-1 to 100-4. As a result, it is possible to understand the condition of communication link 300-1 not only at management terminal apparatus 200 but also at each wireless terminal apparatus 100-1 to 100-4.

Embodiment 2

Feature of Embodiment 2 of the present invention is that the wireless terminal apparatus and the management terminal apparatus communicate via relay terminal apparatus.

Figure 10:
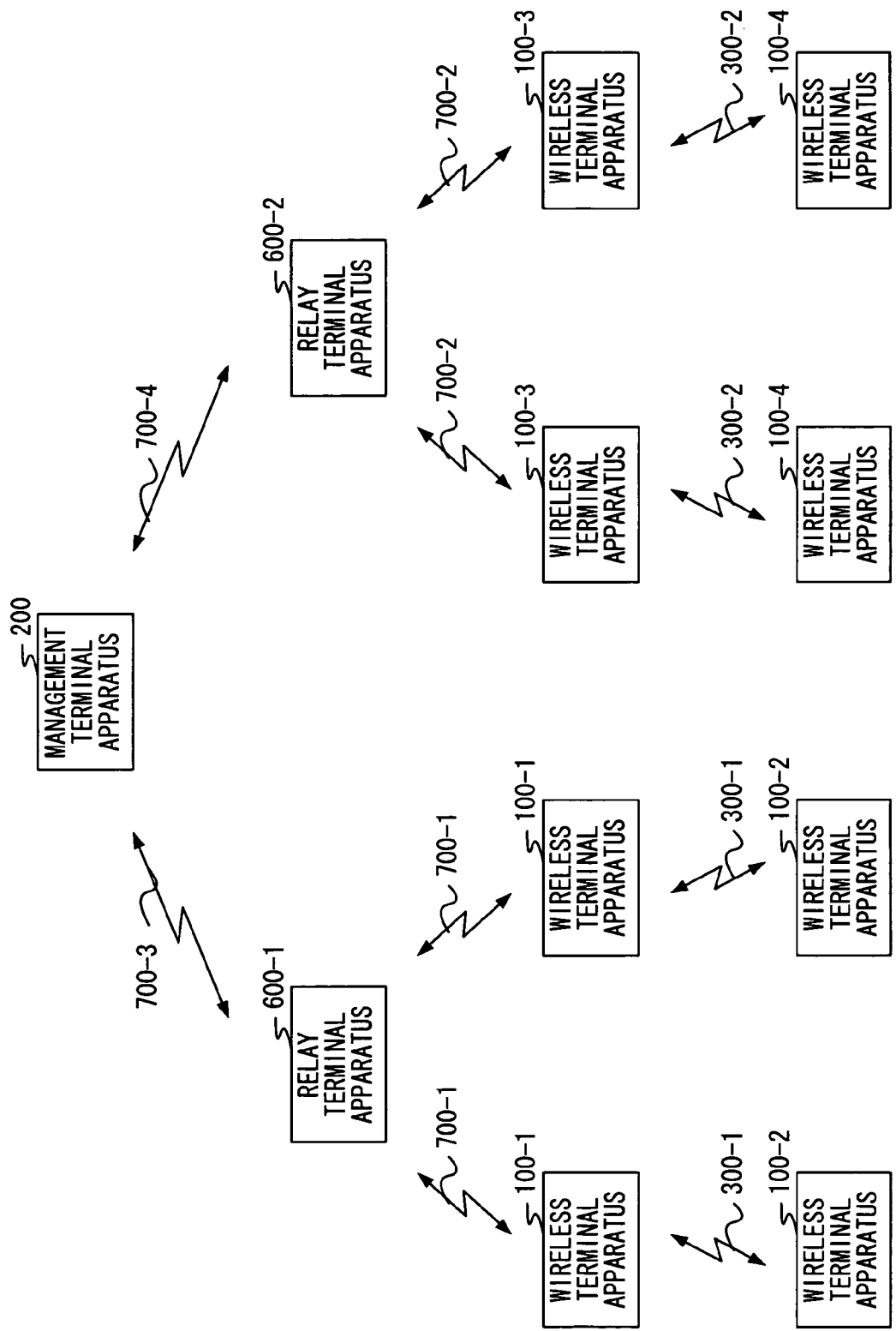
FIG. 10 is a figure showing an example of a wireless communication system according to Embodiment 2 of the present invention.

FIG. 10 is a figure showing an example of a wireless communication system according to this embodiment. In the same drawing, portions that are the same as in FIG. 2 are assigned the same numerals. As shown in FIG. 10, a wireless communication system according to this embodiment has two wireless terminal apparatus 100-1, two wireless terminal apparatus 100-2, two wireless terminal apparatus 100-3, two wireless terminal apparatus 100-4, relay terminal apparatus 600-1, relay terminal apparatus 600-2, and management terminal apparatus 200. The numbers of relay terminal apparatus and wireless terminal apparatus shown in FIG. 10 are respectively arbitrary, and, for example, the number of wireless terminal apparatus carrying out communication with management terminal apparatus 200 via relay terminal apparatus 600-1 and the number of wireless terminal apparatus carrying out communication with management terminal apparatus 200 via relay terminal apparatus 600-2 may be different.

In this embodiment, it is taken that wireless terminal apparatus 100-1 and wireless terminal apparatus 100-2 carry out wireless communication via Bluetooth communication link 300-1, and that wireless terminal apparatus 100-3 and wireless terminal apparatus 100-4 carry out wireless communication via Bluetooth communication link 300-2. Wireless terminal apparatus 100-1 and relay terminal apparatus 600-1 then carry out wireless communication via communication link 700-1 using PHS, and wireless terminal apparatus 100-3 and relay terminal apparatus 600-2 carry out wireless communication via communication link 700-2 using specified low power wireless. Moreover, relay terminal apparatus 600-1 notifies management terminal apparatus 200 that wireless terminal apparatus 100-1 and wireless terminal apparatus 100-2 are carrying out communication via communication link 700-3 using IEEE802.11a. Similarly, relay terminal apparatus 600-2 notifies management terminal apparatus 200 that wireless terminal apparatus 100-3 and wireless terminal apparatus 100-4 are carrying out communication via communication link 700-4 using IEEE802.11a.

In this embodiment, the configuration of wireless terminal apparatus 100-1 to 100-4 and management terminal apparatus 200 is the same with Embodiment 1, and the explanation is therefore omitted.

Figure 11:
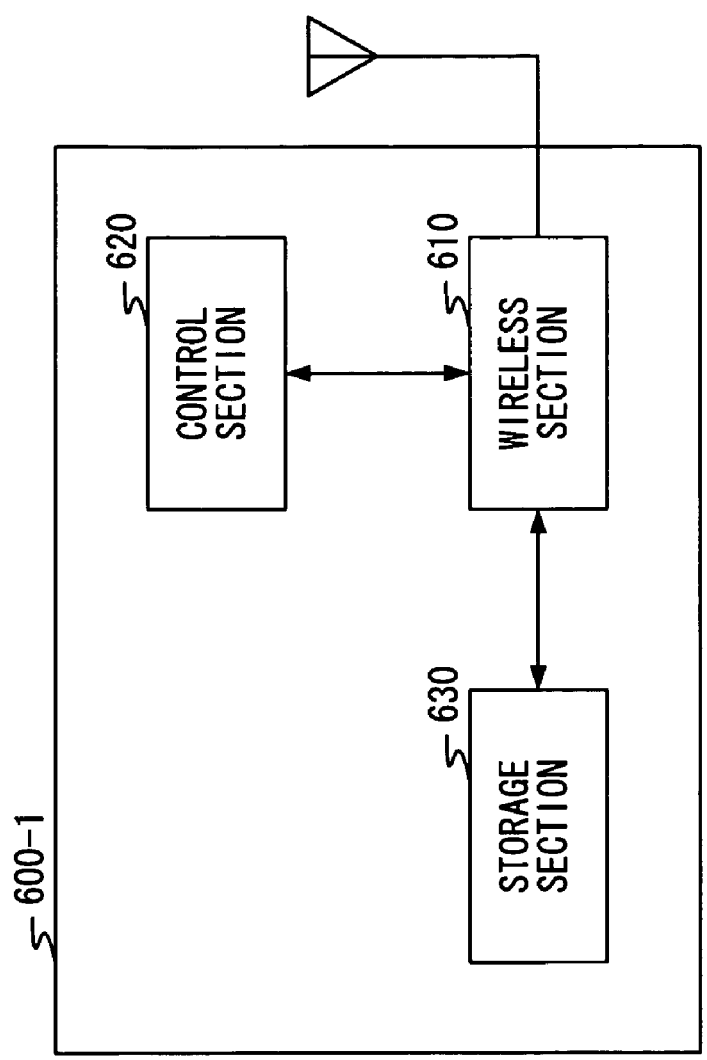
FIG. 11 is a block diagram showing a configuration for the essential parts of a relay terminal apparatus according to Embodiment 2.

FIG. 11 is a block diagram showing a configuration of principal parts of relay terminal apparatus 600-1 according to this embodiment. Relay terminal apparatus 600-2 also includes the configuration shown in FIG. 11. As shown in FIG. 11, relay terminal apparatus 600-1 includes wireless section 610, control section 620 and storage section 630.

Wireless section 610 has an antenna compatible with the wireless communication scheme (i.e. PHS) of communication link 700-1 and the wireless communication scheme (i.e. IEEE802.11a) of communication link 700-3 and is configured using a programmable device capable of being re-configured by, for example, re-writing of software or the like. When communication profile information transmitted from wireless terminal apparatus 100-1 via communication link 700-1 is received, wireless section 610 transmits this communication profile information via communication link 700-3 to management terminal apparatus 200. When communication permit/deny information transmitted from management terminal apparatus 200 via communication link 700-3 is received, wireless section 610 transmits the communication permit/deny information via communication link 700-1 to wireless terminal apparatus 100-1.

Control section 620 then instructs switching of the wireless communication scheme to wireless section 610. Specifically, in the event of carrying out communication via communication link 700-1, control section 620 instructs the wireless communication scheme to be PHS, and in the event of carrying out communication via communication link 700-3, control section 620 instructs the wireless communication scheme to be IEEE802.11a.

Storage section 630 stores information necessary for configuring wireless section 610 according to the wireless communication scheme.

Figure 12A:
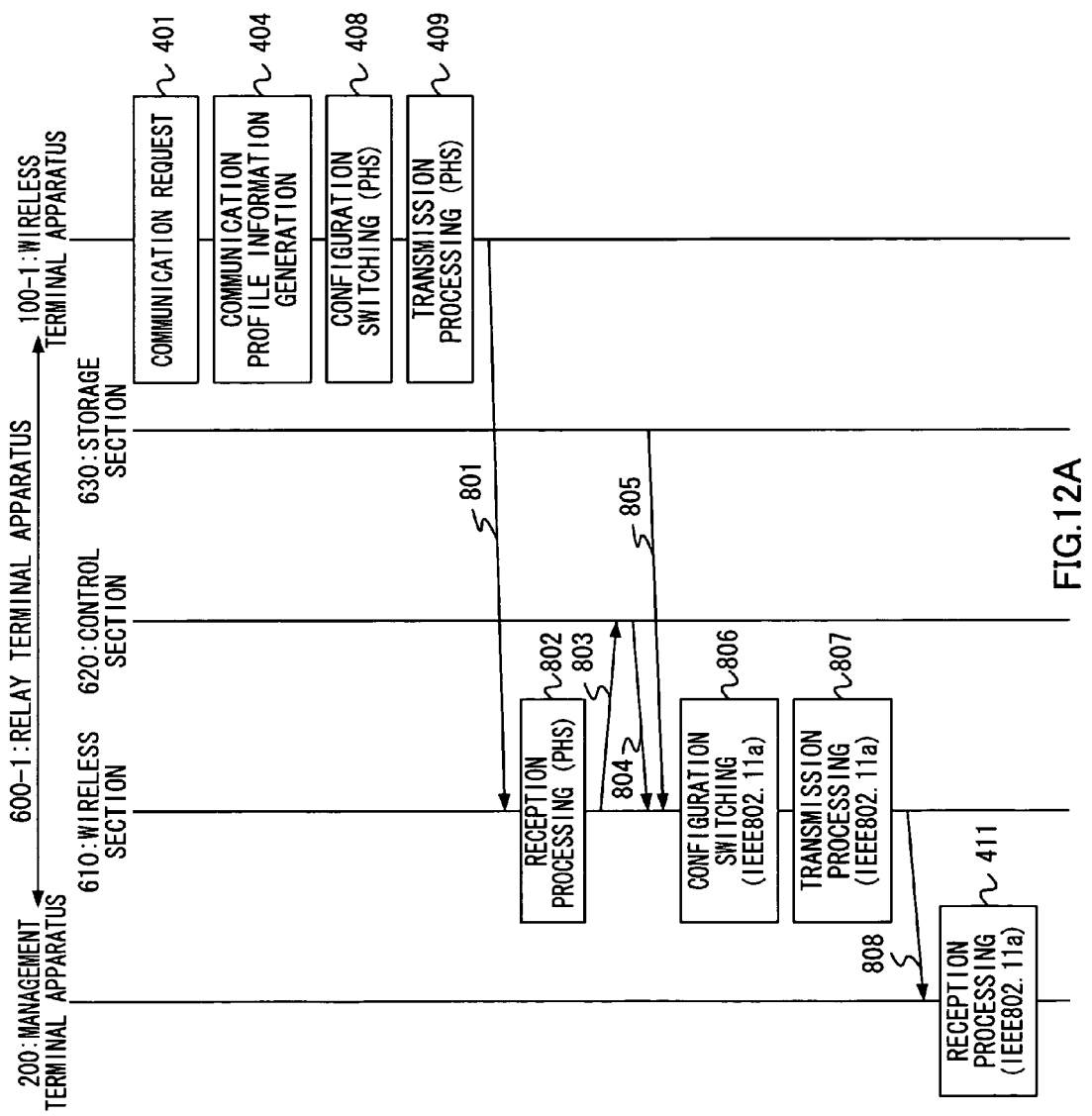
FIG. 12A is a sequence drawing showing the operation of a wireless terminal apparatus, relay terminal apparatus, and management terminal apparatus according to Embodiment 2.
Figure 12B:
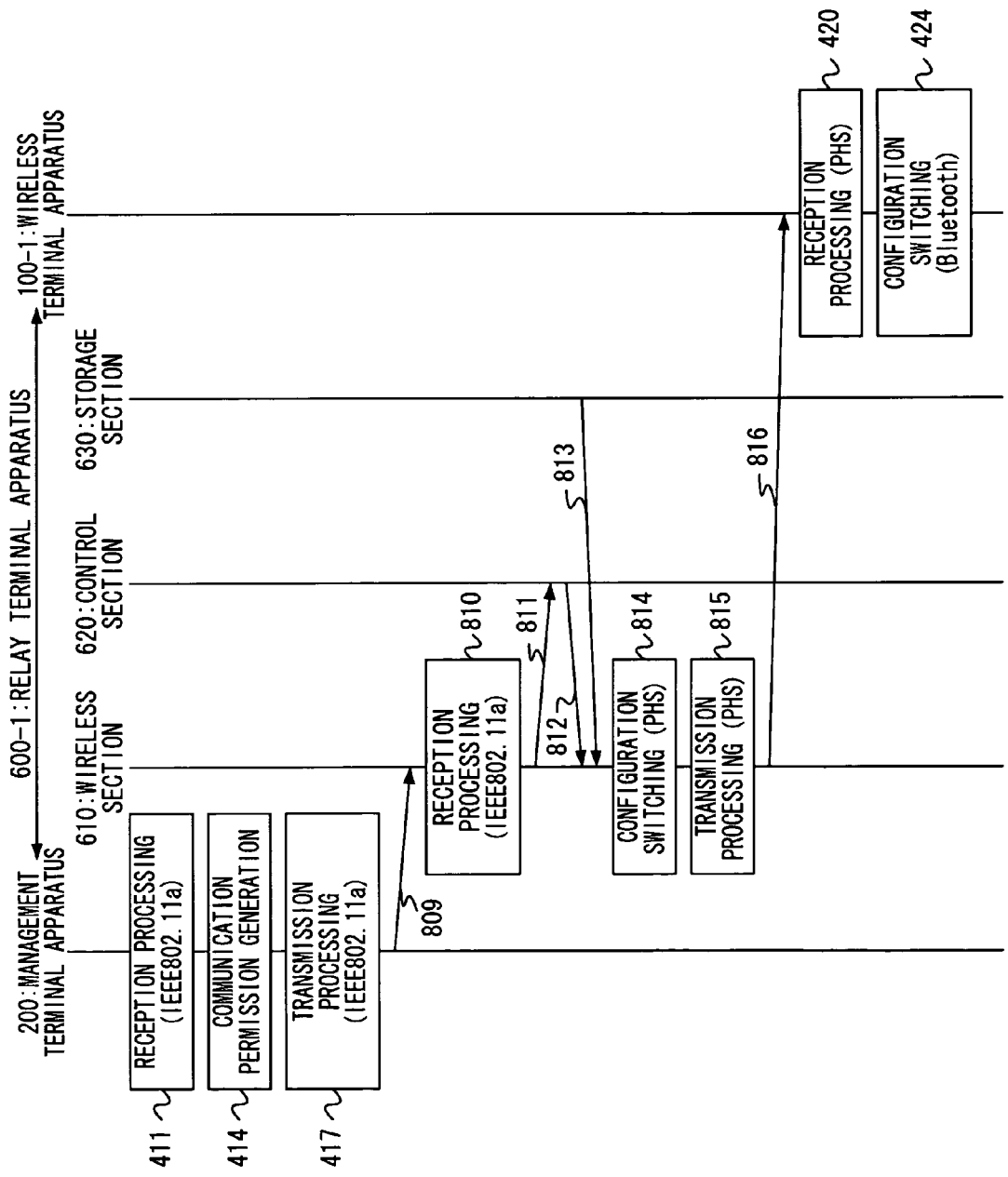
FIG. 12B is a continuation of FIG. 12A.

Next, the operation of wireless terminal apparatus 100-1, relay terminal apparatus 600-1 and management terminal apparatus 200 configured in the above manner will be explained with reference to the sequence drawing shown in FIG. 12A and FIG. 12B. In FIG. 12A and FIG. 12B, portions corresponding to FIG. 5A and FIG. 5B are assigned the same numerals and the detailed explanation is omitted.

First, as in Embodiment 1, when a communication request is generated at wireless terminal apparatus 100-1 (401), communication profile information relating to communication occurring at communication link 300-1 is generated (404), and wireless section 140 is switched over to a configuration corresponding to the wireless communication scheme (i.e. PHS) for transmitting the communication profile information (408). Transmission data containing the communication profile information is then subjected to predetermined transmission processing such as TDMA processing, modulation, orthogonal modulation, frequency conversion, filter processing, amplification or the like in accordance with the communication specification and procedure for PHS by wireless section 140 (409), and is transmitted from the antenna to relay terminal apparatus 600-1 (801).

The transmission data is then received by wireless section 610 of relay terminal apparatus 600-1. This received signal is then subjected to predetermined reception processing such as amplification, filter processing, frequency conversion, demodulation, TDMA demodulation or the like in accordance with the communication specification and procedure of PHS by wireless section 610 (802), and control section 620 is notified of the reception of the communication profile information (803). Upon notification to this effect, an instruction to switch to a configuration corresponding to the wireless communication scheme (i.e. IEEE802.11a) of the communication link 700-3 is outputted from control section 620 to wireless section 610 (804).

Wireless section 610 then reads out configuration information for the wireless communication scheme (IEEE802.11a) of communication link 700-3 from storage section 630 in accordance with the instruction from control section 620 (805) and switches over to a configuration corresponding to IEEE802.11a (806). After this, wireless section 610 generates transmission data conforming with the IEEE802.11a specification contained in the communication profile information received via communication link 700-1 by PHS, implements transmission processing in accordance with the communication specification and procedure of IEEE802.11a (807), and transmits this from the antenna to management terminal apparatus 200 (808).

This transmission data is then received by management terminal apparatus 200 and is subjected to predetermined reception processing of IEEE802.11a (411), and communication permit/deny information is then generated as in Embodiment 1 (414), and the transmission data contained in the communication permit/deny information is then subjected to transmission processing in accordance with the communication specification and procedure of IEEE802.11a (417), and is transmitted from the antenna to relay terminal apparatus 600-1 (809).

In this embodiment, wireless terminal apparatus 100-1, 100-3 and management terminal apparatus 200 exchange communication profile information and communication permit/deny information via relay terminal apparatus 600-1, 600-2, and if one wireless communication scheme used by communication links 300-3 and 300-4 between management terminal apparatus 200 and relay terminal apparatus 600-1, 600-2 is decided in advance (in this embodiment, IEEE802.11a), it is therefore not necessary for management terminal apparatus 200 to switch over the wireless communication scheme.

The transmission data is then received by wireless section 610 of relay terminal apparatus 600-1, subjected to predetermined reception processing of IEEE802.11a (810), and the reception of communication permit/deny information is notified to control section 620 (811). Upon notification to this effect, an instruction to switch to a configuration corresponding to the wireless communication scheme (i.e. PHS) of the communication link 700-1 is outputted from control section 620 to wireless section 610 (812).

Wireless section 610 then reads out configuration information for the wireless communication scheme (PHS) of communication link 700-1 from storage section 630 in accordance with the instruction from control section 620 (813) and switches over to a configuration corresponding to PHS (814). After this, transmission data is generated in line with the PHS specification contained in the communication permit/deny information received via communication link 700-3 using IEEE802.11a by wireless section 610, transmission processing is implemented in accordance with the PHS communication specification and procedure (815), and is transmitted from the antenna to wireless terminal apparatus 100-1 (816).

The transmission data is then received by wireless terminal apparatus 100-1 and subjected to predetermined PHS reception processing (420), and in the event that communication permit information is received, the configuration of wireless terminal apparatus 100-1 is switched over to Bluetooth compatible with communication link 300-1 (424), and communication with wireless terminal apparatus 100-2 is started. In the event that communication deny information is received, the communication profile information generation and transmission processing is carried out again.

As shown above, according to this embodiment, the wireless terminal apparatus and management terminal apparatus exchange communication profile information and communication permit/deny information via relay terminal apparatus, one wireless communication scheme is then decided upon for use in the communication link between the management terminal apparatus and relay terminal apparatus, and switching of the wireless communication scheme at the management terminal apparatus is not necessary. As a result, it is possible to alleviate the processing load of the management terminal apparatus and shorten the time required in processing.

In this embodiment, in the event that, for example, communication profile information is received from one of the wireless terminal apparatus 100-1 by relay terminal apparatus 600-1, rather than transmitting this communication profile information to management terminal apparatus 200 in real time, this communication profile information may be temporarily stored, then transmitted to management terminal apparatus 200 together with communication profile information received from another wireless terminal apparatus 100-1. As a result, in the event of carrying out communications that is not necessary in real time, it is possible to alleviate the received signal traffic at management terminal apparatus 200 and carry out transmission of communication profile information more effectively.

Further, in this embodiment, wireless terminal apparatus 100-1 transmitting communication profile information to relay terminal apparatus 600-1 each carry out communication via communication link 700-1 using PHS, but it is also considered that another wireless terminal apparatus transmits communication profile information to relay terminal apparatus 600-1 via another communication link using, for example, specified low power wireless.

In this case, the wireless section 610 of relay terminal apparatus 600-1 may switch over to a wireless communication scheme every predetermined time. Namely, for example, in a specific duration, the wireless section 610 is configured to be compatible with PHS, reception of communication profile information transmitted from wireless terminal apparatus 100-1 is awaited, and after this, wireless section 610 is switched over to a configuration compatible with specified low power wireless, and the receipt of communication profile information transmitted from another wireless terminal apparatus may be awaited. These durations are not necessary to be all the same length, and durations compatible with the respective wireless communication schemes may be decided upon taking into consideration the communication time, transmission rate, frame length or the like occurring in each wireless communication scheme. Furthermore, the wireless communication scheme may also be switched every section taking, for example, time slots or the like as units. As a result, the number of wireless terminal apparatus which each relay terminal apparatus carries out relaying for does not become skewed by the wireless communication scheme the relay terminal apparatus is compatible with and it is possible to carry out transmission of communication profile information more efficiently.

Embodiment 3

The characteristic of Embodiment 3 of the present invention is that communication with wireless terminal apparatus is managed using an expected throughput value at management terminal apparatus.

Figure 13:
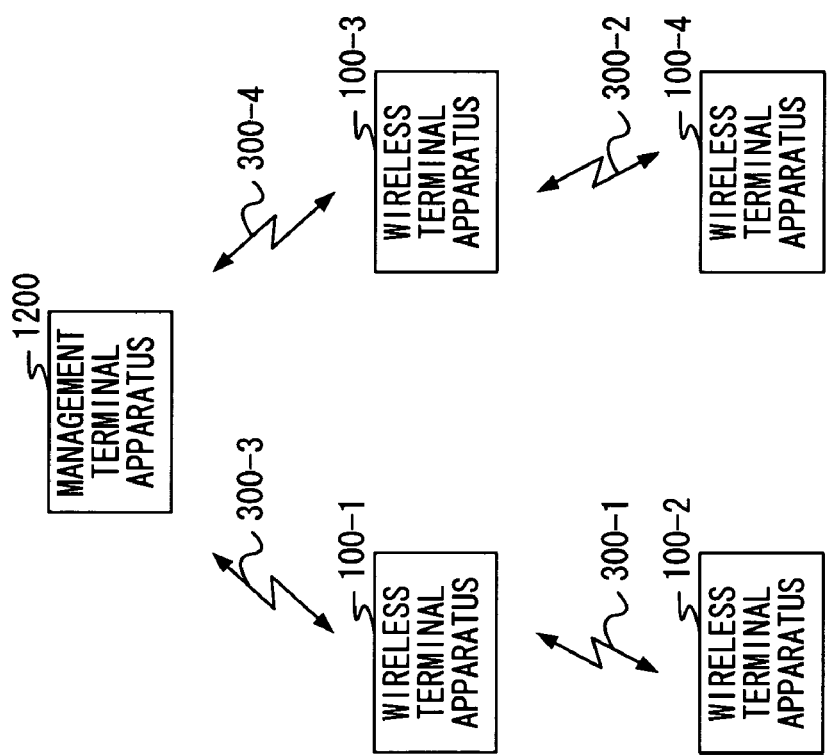
FIG. 13 is a figure showing an example of a wireless communication system according to Embodiment 3 of the present invention.

FIG. 13 is a figure showing an example of a wireless communication system according to this embodiment. In the same drawing, portions that are the same as in FIG. 2 are assigned the same numerals. As shown in FIG. 13, a wireless communication system according to this embodiment includes wireless terminal apparatus 100-1, wireless terminal apparatus 100-2, wireless terminal apparatus 100-3, wireless terminal apparatus 100-4 and management terminal apparatus 1200.

In this embodiment, desired throughput information for each communication link is transmitted from wireless terminal apparatus to management terminal apparatus 1200 together with communication profile information, and at management terminal apparatus 1200, in the event that overlapping of the frequency bandwidth and communication time of each communication link at management terminal apparatus 1200 is not avoided, an expected value for the throughput of each communication link is calculated, and control is exerted so that the desired throughput of each communication link is satisfied. In this embodiment, a difference from Embodiment 1 is the configuration of the communication permission generating section at management terminal apparatus 1200 and the operation of the management terminal apparatus 1200 (in particular, communication permission generating section) and the wireless terminal apparatus, and other portions that are the same as in Embodiment 1, and explanation is therefore omitted.

Figure 14:
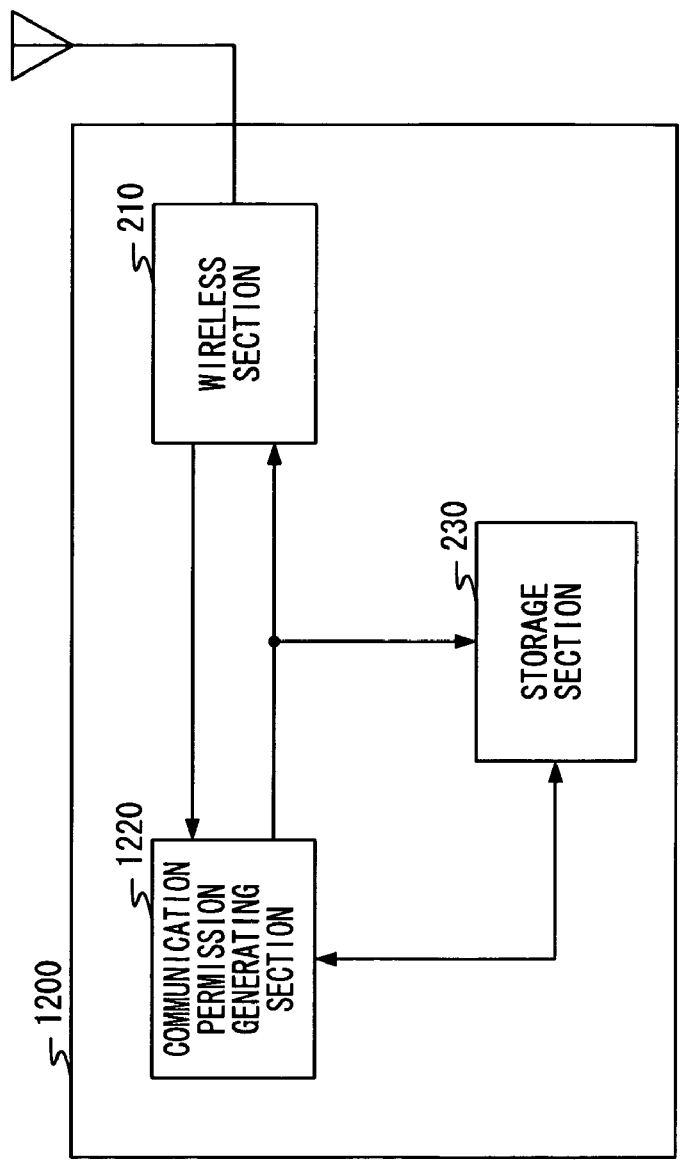
FIG. 14 is a block diagram showing a configuration of principal parts of a management terminal apparatus according to Embodiment 3.

FIG. 14 is a block diagram showing a configuration of principal parts of management terminal apparatus 1200 in this embodiment. As shown in FIG. 14, management terminal apparatus 1200 includes wireless section 210, communication permission generating section 1220 and storage section 230.

Wireless section 210 includes an antenna compatible with the wireless communication scheme (i.e. IEEE802.11a) of communication link 300-3 and communication link 300-4, receives communication profile information and desired throughput information transmitted from wireless terminal apparatus 100-1 and wireless terminal apparatus 100-3, and outputs this to communication permission generating section 1220. Furthermore, wireless section 210 transmits communication permit/deny information generated by communication permission generating section 1220.

Here, "desired throughput information" indicates the minimum necessary desired throughput at the respective communication links.

Communication permission generating section 1220 refers to communication profile information outputted from wireless section 210, desired throughput information, and communication permission history stored in storage section 230, generates communication permit information or communication deny information, and outputs this to wireless section 210 and storage section 230. Furthermore, communication permission generating section 1220 outputs the desired throughput information to storage section 230. In the event that management terminal apparatus 1200 stores communication profile information and desired throughput information in advance in storage section 230, communication permission generating section 1220 may acquire the communication profile information and desired throughput information from storage section 230. In short, communication permission generating section 1220 may acquire communication profile information and desired throughput information by any method.

A difference from the first embodiment is that, in the event that it is determined that overlapping of the frequency bands and communication times of each communication link is not avoided, communication permission generating section 1220 calculates expected throughput values for each communication link, and determines whether or not the expected throughput value for each communication link satisfies the desired throughput for each communication link.

In the event that the result of this determination is that the expected throughput value does not satisfy the desired throughput, communication permission generating section 1220 changes the parameters of the communication profile information and repeats processing that calculates expected throughput values, and determines whether or not the desired throughput is satisfied every time a new expected throughput value is calculated.

In the event that the result of this determination is that the expected throughput value satisfies the desired throughput, communication permission generating section 1220 generates communication permit information based on communication profile information at this time, and outputs this to wireless section 210 and storage section 230.

Furthermore, in the event that it is determined that none of the communication profile information parameters can be changed, or in the event that attempts have been made at combining all of the parameters that can be changed for all of the communication profile information but the expected throughput value does not satisfy the required throughput, communication permission generating section 1220 generates communication deny information and outputs this information to wireless section 210.

Here, "expected throughput value" is the expected value for throughput at each communication link, and can be obtained from the frequency bandwidth of each link, communication start time, communication continuation time, transmission power, modulation scheme, spreading factor, wireless communication scheme, encoding rate or the like.

Storage section 230 stores communication permit/deny information generated by communication permission generating section 1220 as communication permission history. Furthermore, storage section 230 stores desired throughput information occurring at each communication link. Moreover, storage section 230 stores throughput parameter coefficients, interference parameter coefficients and a reference throughput for each wireless communication scheme in advance. The details of the throughput parameter coefficient, the interference parameter coefficient and the reference throughput will be described later.

Figure 15:
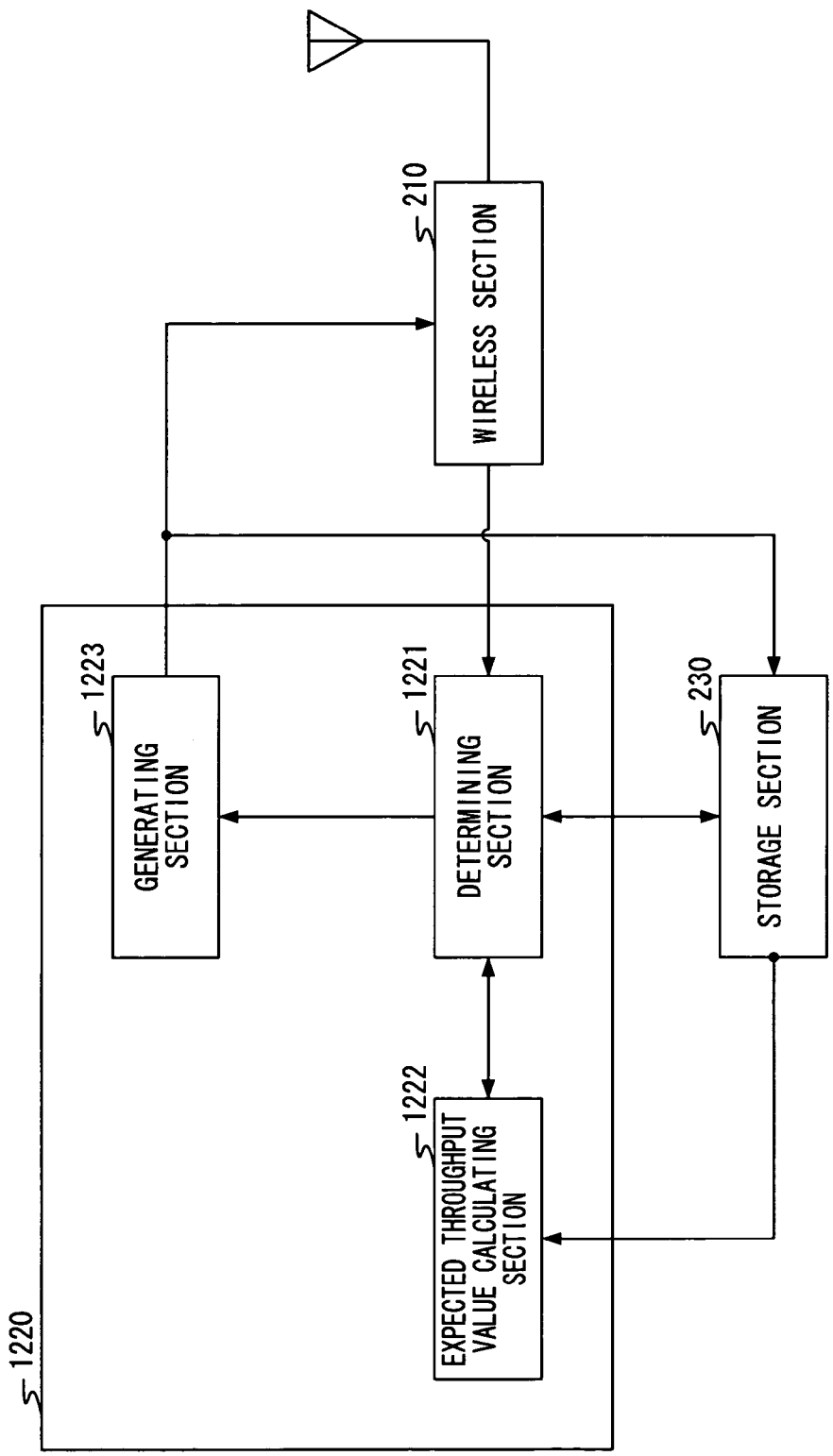
FIG. 15 is a block diagram showing a configuration of principal parts of a communication permission generating section according to Embodiment 3.

FIG. 15 is a block diagram showing a configuration of principal parts of communication permission generating section 1220 of this embodiment. As shown in FIG. 15, communication permission generating section 1220 has determining section 1221, expected throughput value calculating section 122 and generating section 1223.

Determining section 1221 refers to communication profile information outputted from wireless section 210 and communication permission history stored in storage section 230 and determines whether or not the frequency bandwidths and communication times of communications occurring at communication link 300-1 and communication link 300-2 overlap.

In the event that it is determined that frequency bandwidths and communication times of communications occurring at both links do not overlap, determining section 1221 outputs communication profile information to generating section 1223.

On the other hand, in the event that it is determined that the communication frequency bandwidths and communication times of communications occurring at both links do overlap, determining section 1221 determines whether or not the frequency bandwidths and/or the communication times can be changed, and determines whether or not overlapping of the frequency bandwidths and communication times can be avoided as a result of such changes.

In the event that it is determined that overlapping can be avoided, determining section 1221 changes in a manner that frequency bandwidths and/or communication times of the communication profile information do not overlap, and outputs communication profile information to generating section 1223.

On the other hand, in the event that it is determined that both the frequency bandwidths and the communication times cannot be changed, or in the event that it is determined that even if the frequency bandwidths and the communication times are changed, overlapping cannot be avoided, the determining section 1221 outputs communication profile information to expected throughput value calculating section 1222.

Determining section 1221 then refers to an expected throughput value calculated at expected throughput value calculating section 1222 based on this communication profile information, desired throughput information and desired throughput information for each communication link contained in communication permission history stored in storage section 230, and determines whether or not expected throughput values occurring at each communication link satisfy the desired throughputs.

In the event that it is determined that the expected throughput values occurring at each link satisfy the desired throughputs, determining section 1221 outputs communication profile information to generating section 1223.

On the other hand, in the event that it is determined that the expected throughput values occurring at each communication link do not satisfy the desired throughput, determining section 1221 changes the parameters contained in the communication profile information and outputs communication profile information after changing the parameters to expected throughput value calculating section 1222.

Determining section 1221 then determines whether or not expected throughput values calculated at expected throughput value calculating section 1222 satisfy desired throughput occurring at each communication link based on communication profile information after changing parameters.

This "process of changing parameters and determining whether or not calculated expected throughput values satisfy desired throughput based on communication profile information after changing parameters" is repeated until the expected throughput values satisfy the desired throughput values or until all combinations of parameters have been attempted. When the expected throughput values satisfy the desired throughput, communication profile information with parameters changed is outputted from determining section 1221 to generating section 1223. Furthermore, in the event that the expected throughput values do not satisfy the required throughput even when all combinations of parameters have been attempted, a communication deny generation signal is outputted from determining section 1221 to generating section 1223. Moreover, when it is determined that communication is permitted through the expected throughput values satisfying the desired throughput or the like, the desired throughput information is outputted to storage section 230.

Expected throughput value calculating section 122 then calculates expected throughput values for each of communication links that are the targets of expected throughput value calculations that have already started communication (in this embodiment, communication link 300-2), and communication links that are the target of expected throughput value calculations that may possibly start communication from this point on (in this embodiment, communication link 300-1). The calculated expected throughput values are then outputted to determining section 1221.

Specifically, expected throughput value calculating section 1222 refers to communication permission history stored in storage section 230 for communication links that are the subject of expected throughput value calculations for which communication has already started, and calculates expected throughput values. Furthermore, expected throughput value calculating section 1222 calculates expected throughput values for communication links that are the target of expected throughput value calculations for which communication has started based on communication profile information from determining section 1221.

Generating section 1223 generates communication permit information or communication deny information based on communication profile information outputted from determining section 1221 or a communication deny generation signal, and outputs them to wireless section 210 and storage section 230.

Figure 16A:
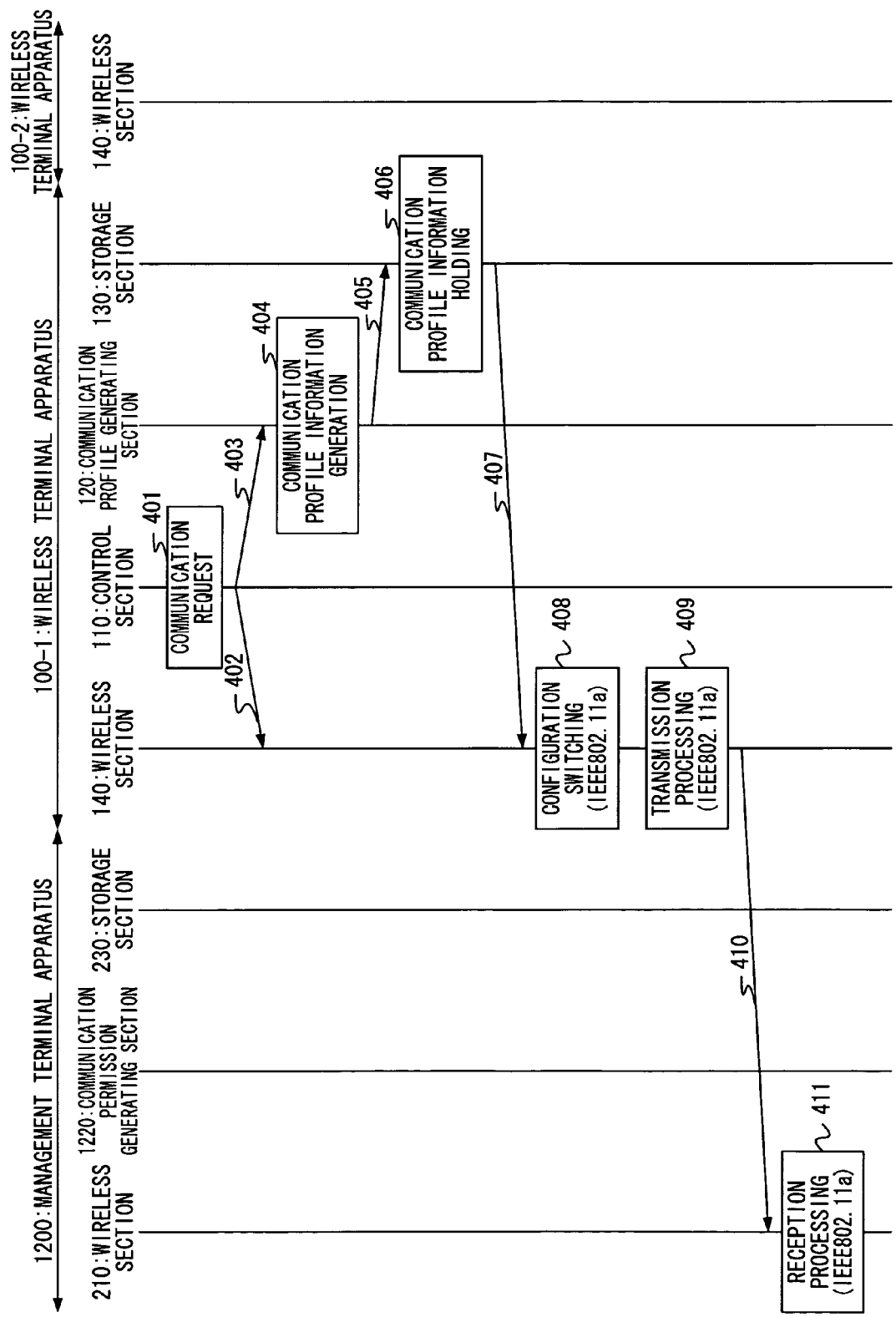
FIG. 16A is a sequence drawing showing the operation of a wireless terminal apparatus and management terminal apparatus according to Embodiment 3.
Figure 16B:
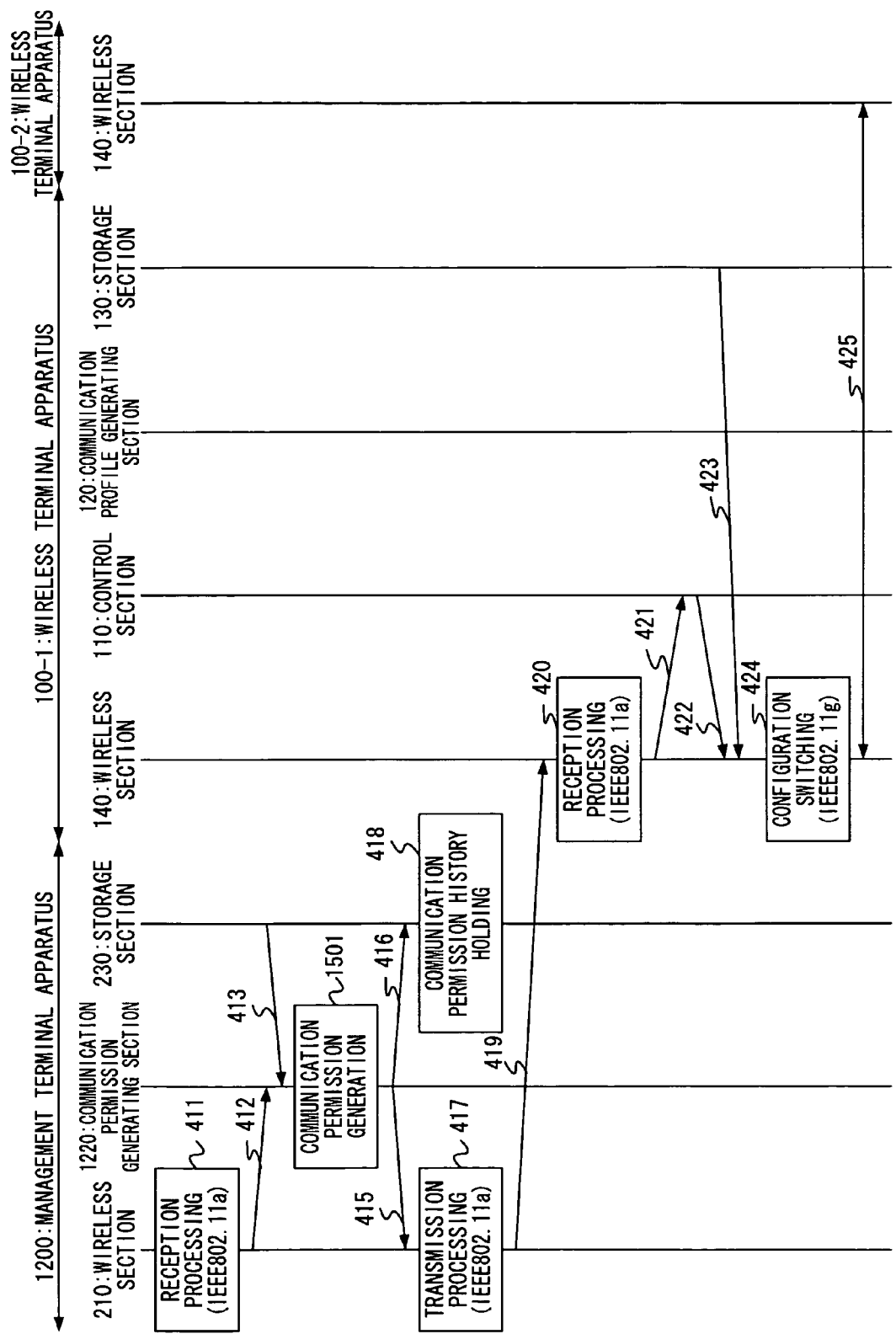
FIG. 16B is a continuation of FIG. 16A.

Next, the operation of wireless terminal apparatus 100-1 and management terminal apparatus 1200 configured in the above manner will be explained with reference to the sequence drawing shown in FIG. 16A and FIG. 16B. In FIG. 16A and FIG. 16B, portions corresponding to FIG. 5A and FIG. 5B are assigned the same numerals, and the detailed explanation is omitted. In the following explanation, it is taken that wireless terminal apparatus 100-3 and wireless terminal apparatus 100-4 have already started to communicate by Bluetooth via communication link 300-2. Communication permission history for communication corresponding to communication profile information generated by communication profile generating section 120 of wireless terminal apparatus 100-3 is therefore stored at storage section 230 of management terminal apparatus 1200. In this embodiment, for example, in addition to the content stored in Embodiment 1, it is taken that this "communication permission history" stores information to the effect that the occupied bandwidth is 1 MHz and frequency hopping pattern information. Furthermore, desired throughput information for communication link 300-2 is also stored, and in the example of this embodiment 0.95 Mbps.

Here, "frequency hopping pattern information" is information indicating which frequency is used at which timing in communication by Bluetooth, and can be made from a Bluetooth clock and a Bluetooth address. Furthermore, "occupied bandwidth" indicates the frequency bandwidth occupied by a certain time band, and with Bluetooth, this is decided at 1 MHz by the specification.

Furthermore, in the following explanation, communication profile information generated by wireless terminal apparatus 100-1 is taken to include wireless communication scheme, modulation scheme, encoding rate, transmission power, used frequency bandwidth, occupied frequency bandwidth, used channel (center frequency), communication start time and communication continuation time. Then, in communication using Bluetooth, it is taken that frequency hopping pattern information is included in the communication profile information. It is also taken that communication requests by wireless terminal apparatus 100-1 using communication link 300-1 are generated two seconds after the occurrence of a request at communication link 300-2 described above, and the content of communication profile information relating to this communication link 300-1 is that the wireless communication scheme is IEEE802.11g, the modulation scheme is 64QAM, the encoding rate is ¾, transmission power is 10 mW, the used frequency bandwidth and occupied frequency bandwidth are 16.6 MHz, the used channel (center frequency) is 2412 MHz, communication start time is two seconds, and communication continuation time is three seconds.

First, as in Embodiment 1, when a communication request is generated at wireless terminal apparatus 100-1 (401), communication profile information relating to communication occurring at communication link 300-1 is generated (404), and wireless section 140 is switched over to a configuration corresponding to the wireless communication scheme (i.e. IEEE802.11a) for transmitting the communication profile information. At this time, desired throughput information occurring at communication link 300-1 is also generated at communication profile generating section 120 together with communication profile information.

It is possible to generate this desired throughput information from the amount of data to transmit and the communication continuation time. Furthermore, this may also be obtained by carrying out arbitrary operations (for example, multiplication of coefficients) with respect to transmission rate determined by the specification or the like. Here, as an example, a desired throughput is 50 Mbps.

Desired throughput information generated in this manner is outputted to storage section 130 as with the communication profile information (405) and is stored by storage section 130 (406).

Transmission data containing the communication profile information and desired throughput information is then subjected to predetermined transmission processing such as convolution encoding, OFDM modulation, orthogonal modulation, frequency conversion, filter processing, amplification or the like by wireless section 140 in accordance with the communication specification and procedures of IEEE802.11a (409), and transmitted from the antenna to management terminal apparatus 1200 (410).

The transmission data is then received by wireless section 210 of management terminal apparatus 1200. This received signal is then subjected to predetermined reception processing of IEEE802.11a by wireless section 210 (411) and communication profile information and desired throughput information is obtained. This communication profile information and desired throughput information is then outputted to communication permission generating section 1220.

Communication permission generating section 1220 determines whether or not to permit/deny communication by communication link (communication link 300-1) for which communication may possibly start, and generates communication permit information and communication deny information according to determination results (1501).

Here, generation of communication permit/deny information by communication permission generating section 1220 will be explained with reference to FIG. 17.

First, communication permission history (communication permission history relating to communication of communication link 300-2 that has already started) stored on storage section 230 is then referred to at determining section 1221 within communication permission generating section 1220 (S1000) and it is determined whether or not communication occurring at communication link 300-1 is possible without overlapping by comparing the communication permission history and the communication profile information (S1100). Namely, it is determined whether or not there is overlapping in the frequencies used by communications (here, communication of communication link 300-2) stored as communication permission history and the frequencies used by communications (here, communication of communication link 300-1) indicated by the communication profile information.

In the event that the result of this determination is that communication of communication link 300-1 shown by the communication profile information is possible without overlapping (S1100: NO), determining section 1221 outputs communication profile information to generating section 1223, and communication permit information with ACK added as communication permit/deny information is generated at generating section 1223 (S1800). At this time, determining section 1221 outputs the desired throughput information to storage section 230 and holds this desired throughput in storage section 230.

Conversely, in the event that it is determined that the frequency of communication link 300-1 indicated by communication profile information overlaps with the frequency of another communication link (S110: YES), it is determined whether or not it is possible to change the used channel in the communication profile information (S1200).

In the event that the results of the determination are that change is possible (S1200: YES), determining section 1221 changes the used channel for the communication profile information to a usable channel, outputs this to generating section 1223, and communication permit information with ACK added as communication permit/deny information is generated at generating section 1223 (S1800).

In the event that the result of this determination is that it is not possible to avoid overlapping of frequencies even if the used channel is changed (S1200: NO), it is determined whether or not the communication time for communication of the communication permission history and the communication time for communication of the communication profile information overlap on the time axis (S1300).

If the result of this determination is that there is overlapping on the time axis (S1300: NO), determining section 1221 determines that communication as indicated by the communication profile information is possible, the used channel for the communication profile information is changed to a usable channel and this is output to generating section 1223, and communication permit information with ACK added to communication profile information is generated at generating section 1223 (S1800).

In the event that the result of this determination is that there is overlapping on the time axis (S1300: YES), a determination is made as to whether or not it is possible to change the communication start time in the communication profile information (S1400).

If the result of the determination is that change of the communication start time is possible (S1400: YES), determining section 1221 changes the communication start time of the communication profile to a time where communication is possible, this is outputted to generating section 1223, and communication permit information with ACK added to communication profile information after the change is generated at generating section 1223 (S1800).

In the event that it is determined that change of the communication start time is not possible (S1400: NO), determining section 1221 outputs the communication profile information to expected throughput value calculating section 1222. Expected throughput value calculating section 1222 then calculates expected throughput values for each of the communication links that are the targets of expected throughput value calculations that have already started communication (in this embodiment, communication link 300-2), and communication links that are the target of expected throughput value calculations that may possibly start communication from this point on (in this embodiment, communication link 300-1) (S2000). The expected throughput value is then outputted to determining section 1221. The details of the calculation of the expected throughput values will be described later.

The order of the determination of whether or not the frequencies overlap (S1100), the determination of whether or not communication is possible at another frequency (S1200), the determination of whether or not communication times overlap (S1300) and the determination of whether or not it is possible to change the communication start times (S1400) is not limited to this, and the order of this processing may be changed, providing that the conditions of the determination of whether or not the frequencies overlap (S1100) being before the determination of whether or not communication is possible at another frequency (S1200), and the determination of whether or not the communication times overlap (S1300) being before the determination of whether or not it is possible to change the communication start times (S1400) are satisfied.

Determining section 1221 refers to expected throughput values outputted from expected throughput value calculating section 1222, desired throughput information (here, desired throughput information of communication link 300-1), and desired throughput information for each link contained in communication permission history stored in storage section 230 (here, desired throughput information for communication link 300-2), and determines whether or not the expected throughput values of each communication link satisfy the desired throughput (S2100).

In the event that it is determined that the desired throughput is satisfied (S2100: YES), determining section 1221 outputs communication profile information to generating section 1223, and communication permit information with ACK added is generated at generating section 1223 (S1800). At this time, determining section 1221 outputs the desired throughput information to storage section 230 and holds this desired throughput in storage section 230.

In the event that it is determined that desired throughput is not satisfied (S2100: NO), determining section 1221 determines whether or not changeable parameters exist, namely determines whether or not all combinations of changeable parameters have been attempted (S2200). Specifically, it is determined whether or not any of the parameters (modulation scheme, encoding rate, transmission power) of the communication profile information are changeable (whether or not any combinations that have not been attempted exist).

In the event that changeable parameters exist (S2200: NO), determining section 1221 changes parameters included in the communication profile information (S2300). Communication profile information after this parameter changing is outputted to expected throughput value calculating section 1222. Expected throughput value calculating section 1222 then re-calculates expected throughput values for each of communication links that are the targets of expected throughput value calculations that have already started communication (in this embodiment, communication link 300-2), and communication links that are the target of expected throughput value calculations that may possibly start communication from this point on (in this embodiment, communication link 300-1) (S2000). The expected throughput value of a communication link (in this embodiment, communication link 300-1) of a target of expected throughput value calculation that is capable of starting these communications is then calculated based on the communication profile after parameter conversion.

These processes (S2300, S2000 and S2100) are then repeated until the expected throughput value satisfies the desired throughput, or until all combinations of the changeable parameters have been attempted. In the event that the expected throughput value satisfies the desired throughput as a result of repeating this processing (S2100: YES), determining section 1221 outputs communication profile information with parameters changed with respect to generating section 1223, and communication permit information with ACK added is generated at generating section 1223 (S1800). Furthermore, in the event that it is determined in S2200 that all combinations of changeable parameters have been attempted (S2200: YES), determining section 1221 outputs a communication deny generation signal to generating section 1223, and communication deny information with NACK added is generated at generating section 1223 (S1900).

Returning to FIG. 16, in 1501, when communication permit/deny information is generated, the communication permit/deny information is outputted to wireless section 210 (415), and at the same time, communication permit/deny information is also outputted to storage section 230 (416) and stored as communication permission history (418).

Next, this communication permit/deny information is transmitted from wireless section 210 to wireless terminal apparatus 100-1, and processing is carried out at wireless terminal apparatus 100-1 based on the communication permit/deny information. These operations are the same as Embodiment 1, and the explanation is omitted.

Here, a method for calculating expected throughput values will be explained. Expected throughput values can be obtained using the following equation (1).

[Equation 1]

$$\text{Expected throughput value} = \text{Reference throughput} \times \text{Throughput parameter coefficient} \times (1 - \text{Degree of interference}) \quad (1)$$

In equation (1), "reference throughput" is the throughput occurring at a parameter (modulation scheme and encoding rate in this embodiment) decided for each wireless communication scheme. It is possible to show respective examples of "throughput parameter coefficients" in table 1 and table 2 as respective examples of coefficients indicating change in throughput in the event of changing each parameter with respect to each parameter of the reference throughput for each wireless communication scheme.

Here, table 1 shows the reference throughput for IEEE802.11a and Bluetooth. Table 2(a) and (b), and table 3(a) and (b) show throughput parameter coefficients for modulation schemes and encoding rates for each of IEEE802.11a and Bluetooth.

It is possible to obtain these reference throughput and throughput parameter coefficients from the specifications for each wireless communication schemes. For example, in IEEE802.11a, when the modulation scheme for the reference throughput parameters is taken to be 64QAM and the encoding rate is taken to be ¾, the reference throughput becomes 54 Mbps.

Furthermore, the throughput parameter coefficient is the amount of change of throughput when each of the parameters for modulation scheme and encoding rate are changed with respect to reference throughput and are as in table 2. As an example, in the event that the modulation scheme is changed from 64QAM to QPSK, the throughput becomes 18 Mbps that is ⅓ of 54 Mbps, and the throughput parameter coefficient becomes ⅓. Furthermore, the throughput parameter coefficients in Bluetooth are shown in table 3.

TABLE 1

| Reference Throughput | |
|---|---|
| Wireless communication scheme | Reference throughput |
| IEEE 802.11a | 54 Mbps |
| Bluetooth | 1 Mbps |

TABLE 2(a)

Modulation scheme throughout parameter coefficients for IEEE802.11a

| Modulation scheme | Throughput parameter coefficient |
|---|---|
| BPSK | 1/6 |
| QPSK | 1/3 |
| 16QAM | 2/3 |
| 64QAM | 1 |

TABLE 2(b)

Encoding rate throughput parameter coefficients for IEEE802.11a

| Encoding rate | Throughput parameter coefficient |
|---|---|
| 1/2 | 2/3 |
| 2/3 | 8/9 |
| 3/4 | 1 |

TABLE 3(a)

Modulation scheme throughput parameter coefficients for Bluetooth

| Modulation scheme | Throughput parameter coefficient |
|---|---|
| GFSK | 1 |

TABLE 3(b)

Encoding rate throughput parameter coefficients for Bluetooth

| Encoding Rate | Throughput parameter coefficient |
|---|---|
| 1/3 | 1/2 |
| 2/3 | 1 |

Furthermore, in equation (1), "degree of interference" indicates the magnitude of interference incurred from other communication links and can be obtained from equation (2).

[Equation 2]

$$\text{Degree of interference} = \frac{\text{Interference parameter coefficient}}{\text{Unit time}} \times \int_{\text{Unit time}} \frac{\text{Overlapping bandwidth}}{\text{Own bandwidth}} \times \frac{\text{Other overlapping communication link power}}{\text{Own power} + \text{Other overlapping communication link power}} \quad (2)$$

In equation (2), "interference parameter coefficient" is a coefficient indicating change in influence on interference in the case of carrying out change for each parameter when influence due to interference occurring for parameters (modulation scheme and encoding rate) decided for each wireless communication scheme is taken to be 1, with examples being as shown in table 4 and table 5.

Further, table 4(a) and (b), and table 5(a) and (b) show interference parameter coefficients for modulation scheme and encoding rate for each of IEEE802.11a and Bluetooth.

For example, in IEEE802.11a, when the influence due to interference in 64QAM is taken to be 1, the influence due to interference occurring at QPSK becomes 1/20. These interference parameter coefficients can be obtained from receiver sensitivity characteristics (CNR versus BER characteristic) for each modulation scheme and encoding rate occurring each wireless communication scheme.

TABLE 4(a)

Modulation scheme interference parameter coefficients for IEEE802.11a

| Modulation scheme | Interference parameter coefficients |
|---|---|
| BPSK | 1/40 |
| QPSK | 1/20 |
| 16QAM | 1/4 |
| 64QAM | 1 |

TABLE 4(b)

Encoding rate interference parameter coefficients for IEEE802.11a

| Encoding rate | Interference parameter coefficients |
|---|---|
| 1/2 | 1/2 |
| 2/3 | 7/10 |
| 3/4 | 1 |

TABLE 5(a)

Modulation method interference parameter coefficients for Bluetooth

| Modulation scheme | Interference parameter coefficients |
|---|---|
| GFSK | 1 |

TABLE 5(b)

Encoding rate interference parameter coefficients for Bluetooth

| Encoding rate | Interference parameter coefficients |
| --- | --- |
| 1/3 | 1/2 |
| 2/3 | 1 |

Furthermore, in equation (2), "own frequency band" and "own transmission power" is the frequency band and transmission power of the communication link that is the target for carrying out calculation of expected throughput value, and "overlapping frequency bandwidth" is the frequency band where an own frequency band overlaps with another communication link. Moreover, "other overlapping communication link power" is the transmission power of other communication links in the overlapping frequency band.

Figure 18:
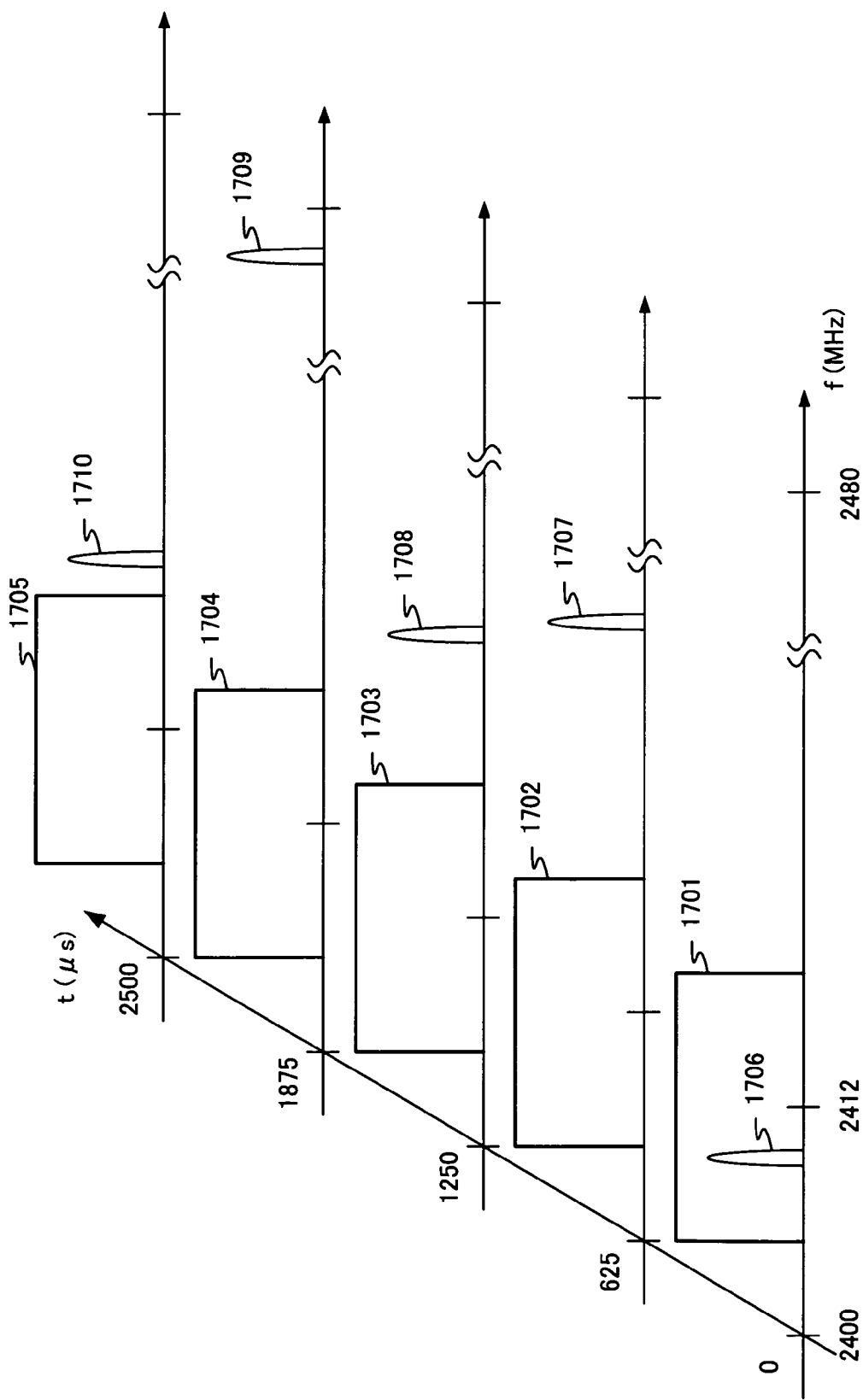
FIG. 18 is a figure showing an example of a communication spectrum for communication permission history and communication profile information according to Embodiment 3.

From the above operation, it is possible to obtain expected throughput values for each communication link. An explanation will be given in the following using specific numbers. In this embodiment, as shown in FIG. 18, the frequency used in communication of communication link 300-1 (1701 to 1705) and the frequency (1706 to 1710) used in communication of communication link 300-2 (1706 to 1710) are taken to overlap at a rate of one time every five hops. Furthermore, the unit time is taken to be one second.

First, expected throughput value calculating section 1222 substitutes (sets) each parameter in equation (2) in order to calculate the degree of interference of communication link 300-1. Namely, expected throughput value calculating section 1222 functions as operation apparatus for calculating the degree of interference using equation (2). Here, as the modulation scheme is 64QAM and the encoding rate is ¾, the interference parameter coefficient is 1, and the overlapping frequency band, own frequency band, own power and other overlapping communication link power are 1 MHz, 16.6 MHz, 10 mW and 1 mW. Further, the time the frequency bands overlap for is ⅕ of a second for one section, and the frequency bands do not overlap for the remaining ⅘ seconds, and the degree of interference is therefore as in the following equation (3).

[Equation 3]

$$\text{Degree of interference} = \frac{1 \times 1}{1 \text{ Second}} \times \int_{Second} \frac{1 \text{ MHz}}{16.6 \text{ MHz}} \times \frac{1 \text{ mW}}{10 \text{ mW} + 1 \text{ mW}}$$
$$= \frac{1}{1 \text{ Second}} \int_{Second} \frac{1}{182.6}$$
$$= \frac{1}{5} \times \frac{1}{182.6}$$
$$\approx 1.1 \times 10^{-3}$$
(3)

In order to calculate the expected throughput value, expected throughput value calculating section 1222 substitutes (sets) this degree of interference and another value (reference throughput and throughput parameter coefficient) in equation (1). Namely, expected throughput value calculating section 1222 functions as operation apparatus for calculating expected throughput value by equation (1).

Here, the reference throughput is 54 Mbps, the throughput parameter coefficient also becomes 1 because the modulation scheme is 64QAM and the encoding rate is ¾, and the expected throughput value can be calculated as shown in equation (4) below.

[Equation 4]

$$\text{Expected throughput value} = 54 \text{ Mbps} \times 1 \times 1 \times (1 - 1.1 \times 10^{-3})$$
$$= 53.94 \text{ Mbps}$$
(4)

Similarly, when the degree of interference of communication link 300-2 and the expected throughput value are obtained, this becomes as follows.

[Equation 5]

$$\text{Degree of interference} = \frac{1 \times 1}{1 \text{ Second}} \times \int_{Second} \frac{1 \text{ MHz}}{1 \text{ MHz}} \times \frac{10 \text{ mW} \times \frac{1 \text{ MHz}}{16.6 \text{ MHz}}}{1 \text{ mW} + 10 \text{ mW} \times \frac{1 \text{ MHz}}{16.6 \text{ MHz}}}$$
$$= \frac{1}{1 \text{ Second}} \int_{Second} \frac{10}{26.6}$$
$$= \frac{1}{5} \times \frac{10}{26.6}$$
$$\approx 7.5 \times 10^{-2}$$
(5)

$$\text{Expected throughput value} = 1 \text{ Mbps} \times 1 \times 1 \times (1 - 7.5 \times 10^{-2})$$
$$= 0.925 \text{ Mbps}$$
(6)

From the above procedure, it is possible to obtain expected throughput values for each communication link.

Next, determination of whether or not the expected throughput value of each communication link satisfies the desired throughput will be explained. The expected throughput values obtained in equation (4) and equation (6) above are shown in table 6. From table 6, the desired throughput is satisfied for communication link 300-1 but, it is determined that the desired throughput is not satisfied for communication link 300-2.

TABLE 6

Desired throughput and expected throughput values for each communication link

| Communication link | Desired throughput | Expected throughput values |
| --- | --- | --- |
| 300-1 | 50 Mbps | 53.94 Mbps |
| 300-2 | 0.95 Mbps | 0.925 Mbps |

Next, change in parameters for communication profile information will be explained. At determining section 1221, communication link 300-1 of communication profile information from table 6 satisfies the desired throughput but communication link 300-2 that is already carrying out communication does not satisfy the desired throughput, and the parameters are therefore changed in a manner that expected throughput values of each communication link satisfy the desired throughput by making the influence of degree of interference provided by communication link 300-1 to other terminals small. In this embodiment, as an example, transmission power is changed.

Here, in the event that only the transmission power of the parameters for the communication profile information is changed, it is possible to obtain conditions for transmission power that satisfies the desired throughput using equation (1) and equation (2). This specific procedure will be described in the following.

At communication link 300-2, the necessary desired throughput is 0.95 Mbps and it is therefore necessary for the frequency to satisfy the following equation (7).

[Equation 6]

$$0.95 \leq 1 \text{ Mbps} \times 1 \times 1 \times (1 - \text{Degree of interference}) \quad (7)$$

From equation (7), the conditions for degree of interference where the expected throughput value satisfies the desired throughput are as in equation (8).

[Equation 7]

$$\text{Degree of interference} \leq 0.05 \quad (8)$$

It is possible to obtain the conditions for transmission power of communication link 300-1 by taking the transmission power of communication link 300-1 as a variable and substituting this condition in equation (1). Equation (9) is then given by substituting equation (8) in equation (1).

[Equation 8]

$$0.05 \geq \frac{1 \times 1}{1 \text{ Second}} \times$$
$$\int_{Second} \frac{1 \text{ MHz}}{1 \text{ MHz}} \times \frac{\text{Transmission power} \times \frac{1 \text{ MHz}}{16.6 \text{ MHz}}}{1 \text{ mW} + \text{Transmission power} \times \frac{1 \text{ MHz}}{16.6 \text{ MHz}}} \geq \quad (9)$$
$$\frac{1}{5} \times \frac{\text{Transmission power}}{16.6 + \text{Transmission power}}$$

The conditions of equation (10) in the following are then obtained from equation (9).

[Equation 9]

$$\text{Transmission power} \leq 5.533 i (\text{mW}) \quad (10)$$

From the above, it is understood that it is possible for the desired throughput of communication link 300-2 to be satisfied by changing the transmission power of the communication profile information to 5.533 m or less. In this embodiment, as an example, transmission power is changed to 5 mW.

Next, the transmission power of the communication profile information is changed from 10 mW to 5 mW, the changed communication profile information is outputted to expected throughput value calculating section 1222, and the expected throughput value for each communication link is calculated by again using equation (1) and equation (2). This calculation is the same as the procedure described above, and is therefore omitted. The expected throughput values of each link obtained in this calculation are shown in table 7.

TABLE 7

Desired throughput and expected throughput values for each communication link (change of transmission power)

| Communication link | Desired throughput | Expected throughput values |
|---|---|---|
| 300-1 | 50 Mbps | 53.89 Mbps |
| 300-2 | 0.95 Mbps | 0.965 Mbps |

From table 7, it can be understood that, by changing the transmission power of communication profile information to 5 mW, it is possible to obtain expected throughput values that satisfies the desired throughput for whichever of the communication links.

From the above procedure, the parameters for the communication profile information are changed and the expected throughput value is calculated. Here, in this embodiment, the transmission power is changed, but this is by no means limiting and it is also possible to change the modulation scheme or encoding rate. Furthermore, conditions for transmission power are obtained from the desired throughput during changing of parameters, but this is by no means limiting and it is also possible to change the order of values for each parameter, and use combinations of parameters satisfying the desired throughput of each communication link first as communication profile information. Furthermore, it is also possible to use the parameters for which the total value for the expected throughput values is a maximum as communication profile information after calculating the expected throughput value for all parameter combinations and after combining parameters that satisfies the desired throughput for each communication link.

Communication permit/deny information generated in this manner is transmitted to wireless terminal apparatus 100-1 via communication section 210, and communication of communication link 300-1 is started in a manner as not to interfere with communication of communication link 300-2.

In this way, according to this embodiment, whether or not competition for wireless resources is occurring for the management terminal apparatus at another communication link is determined based on communication profile information relating to the communication link generating the communication request. In the event that competition for wireless resources occurs, by changing communication profile information or denying start of communication, it is possible to reduce interference and improve communication quality under a communication environment where a plurality of wireless communication schemes are mixed. Furthermore, as a result of the management terminal apparatus calculating the expected throughput value occurring at each communication link based on communication profile information and managing wireless resources in a manner as to satisfy the desired throughput at each communication link, it is possible to carry out communication in a state where the desired throughput is satisfied even in cases where the frequency bands and the communication times overlap.

In this embodiment, management terminal apparatus 1200 is notified of communication profile information only before starting communication with each wireless terminal apparatus but it is also possible for the management terminal apparatus 1200 to be notified of information relating to communication results after communication with each wireless terminal apparatus is complete. Information relating to communication results may be a Received Signal Strength Indicator (RSSI), Signal to Noise Ratio (SNR), Carrier to Noise Ratio (CNR), bit error rate, frame error rate and received signal frequency characteristic. In this way, management terminal apparatus 1200 is capable of understanding communication results and propagation path characteristics of each wireless communication link and it is possible to carry out more appropriate control. The actual throughput of each communication link may also be notified to management terminal apparatus 1200. At this time, at the management terminal apparatus 1200, it is possible to calculate more accurate expected throughput values by updating the throughput parameter coefficients and interference parameter coefficients based on differences in actual throughput and expected throughput values.

Further, in this embodiment, parameters relating to communication of communication links for which there has been a notification are changed by changing parameters of the communication profile information, but this is by no means limiting and it is also possible to use a configuration where weightings are added to each communication link at the communication profile information, and then change parameters or interrupt communication from communication links with the lowest importance in accordance with this priority. As a result, a situation where a communication link with the low importance occupies a communication resource and a communication link with high importance cannot communicate can be avoided.

Furthermore, in this embodiment, two parameters of modulation scheme and encoding rate for throughput parameter coefficients and interference parameter coefficients is described, but this is by no means limiting, and in the case of wireless communication scheme carrying out, for example, spectrum diffusion, it is possible to have just one parameter that is changed based on a throughput parameter coefficient and an interference parameter coefficient.

Moreover, in this embodiment, there is one type of communication link carrying out communication, but this is by no means limiting and the present invention is also applicable in the case where a plurality of communication links already carrying out communication exist. In this event, the frequency bandwidth of the own bandwidth, overlapping with one or more of the other communication links is taken to be the overlapping bandwidth and the total transmission power of the other wireless communication links of the overlapping bandwidth are taken to be the other overlapping communication link power, so that is possible to obtain the expected throughput values using the same procedure. As a result, compatibility of the management terminal apparatus 1200 with respect to a plurality of wireless communication links is possible.

Furthermore, in the above, an explanation is given of the case where parameters for communication links that are already carrying out communication are not changed but parameters for communication links for which communication may start are changed, and changed parameters where the expected throughput values for both communication links satisfy the desired throughput are applied to communication links that communication possibly may start. However, this is by no means limiting, and in cases where there is a margin in the desired throughput occurring at communication links where communication is already being carried out, namely cases where the desired throughput is larger than the expected throughput value or the like, it is also possible to change parameters for communication links where communication is already being carried out. Naturally, it is also possible to change parameters of both communication links in cases where there is a margin in the desired throughput occurring at both communication links.

The wireless terminal apparatus according to a first aspect of the present configuration adopts a configuration having a generating section generating communication profile information containing information for a wireless communication scheme, used frequency bandwidth, communication start time, and/or a communication continuation time corresponding to a communication request in the event that the communication request occurs with another wireless terminal apparatus, and a transmission section transmitting generated communication profile information to the management terminal apparatus.

According to this configuration, as communication profile information is transmitted to management terminal apparatus, it is possible to determine whether or not competition for wireless resources is occurring at the management terminal apparatus, and in the event that competition for wireless resources is occurring, it is possible to change the communication profile information or deny start of communication so as to reduce interference and improve communication quality under a communication environment where a plurality of wireless communication schemes are mixed.

Wireless terminal apparatus according to a second aspect of the present invention adopts a configuration where, in the first aspect, the generating section, in addition to the information, further generates communication profile information containing at least one of a modulation scheme, encoding rate, transmission power and spreading factor corresponding to the communication request.

Wireless terminal apparatus according to a third aspect of the present invention adopts a configuration where, in the first aspect, the generating section, in addition to the communication profile information, generates required throughput information corresponding to the communication request, and the transmission section transmits the generated communication profile information and the desired throughput information to the management terminal apparatus.

According to this configuration, as communication profile information is transmitted to management terminal apparatus, it is possible to determine whether or not competition for wireless resources is occurring at the management terminal apparatus, and in the event that competition for wireless resources is occurring, it is possible to change the communication profile information or deny start of communication so as to reduce interference and improve communication quality under a communication environment where a plurality of wireless communication schemes are mixed.

Furthermore, as it is possible for management terminal apparatus to acquire communication profile information and desired throughput information, it is also possible to calculate expected throughput values occurring at each communication link based on communication profile information. It is further possible for the management terminal apparatus to carry out communication in a state where mutually desired throughput is satisfied even in cases where frequency bandwidth and communication time overlap by managing wireless resources in a manner that the desired throughput occurring at each communication link is satisfied.

Wireless terminal apparatus according to a fourth aspect of the present invention adopts a configuration where, in the first aspect, the transmission section transmits the communication profile information using a wireless communication scheme different to the wireless communication scheme corresponding to the communication request.

According to this configuration, communication profile information is transmitted using a wireless communication scheme different to the wireless communication scheme corresponding to the communication request. Transmission and receipt of communication profile information therefore does not influence communication with wireless terminal apparatus.

Wireless terminal apparatus according to a fifth aspect of the present invention adopts a configuration where, in the first aspect, a receiving section receiving communication permit/deny information indicating permission or denial of communication corresponding to the communication profile information from the management terminal apparatus is further provided, and the transmission section starts communication with the other wireless terminal apparatus in the event that the communication permission information is received.

According to this configuration, as communication with wireless terminal apparatus is started in the event that communication permit information is received, competition for wireless resources with communication occurring with other wireless terminal apparatus does not occur, and it is possible to improve communication quality.

Wireless terminal apparatus according to a sixth aspect of the present invention adopts a configuration where, in the fifth embodiment, the generating section generates new communication profile information in the event that communication deny information is received, and the transmission section transmits generated new communication profile information to the management terminal apparatus in the event that communication deny information is received.

According to this configuration, new communication profile information is transmitted in the event that communication deny information is received, and transmission of new communication profile information is continued until communication permit information is received, and communication with wireless terminal apparatus can be carried out in a reliable manner.

Wireless terminal apparatus according to a seventh aspect of the present invention adopts a configuration where, in the fifth aspect, the receiving section receives communication permit information containing changed communication profile information where at least one item of information contained in the communication profile information is changed, and the transmission section starts communication with the other wireless terminal apparatus in accordance with the changed communication profile information.

According to this configuration, as information contained in the communication profile information is changed and communication is started, the possibility of communication with wireless terminal apparatus therefore becomes high, competition for wireless resources is prevented, and communication can be carried out with wireless terminal apparatus more efficiently.

Wireless terminal apparatus according to an eighth aspect of the present invention adopts a configuration where, in the first aspect, a receiving section receiving communication permit/deny information indicating permission or denial of communication corresponding to the communication profile information from the management terminal apparatus is provided, and the transmission section transmits notification of completion of the communication to the management terminal apparatus after communication is complete based on communication permit information from the management terminal apparatus.

According to this configuration, wireless terminal apparatus notifies management terminal apparatus of the completion of communication, and the management terminal apparatus can then apply wireless resources applied to the communication that has completed to other communications, and efficient utilization of wireless resources is possible.

Wireless terminal apparatus according to an ninth aspect of the present invention adopts a configuration where, in the first aspect, a receiving section receiving communication permit/deny information indicating permission or denial of communication corresponding to the communication profile information from the management terminal apparatus is further provided, and the transmission section transmits actual throughput in communications based on communication permit information from the management terminal apparatus to the management terminal apparatus.

According to this configuration, at the management terminal apparatus, it is possible to acquire actual throughput occurring in communication based on communication permit information, and update actual coefficients utilized during expected throughput value calculations based on differences in this actual throughput and expected throughput values calculated for the communication the throughput is obtained for, making it possible to achieve more accurate expected throughput calculations. More preferable communication is then possible at each wireless link as a result of managing wireless resources based on this accurate expected throughput value.

The management terminal apparatus according to a tenth aspect of the present invention adopts a configuration having an information acquiring section acquiring communication profile information containing information for a wireless communication scheme, used frequency bandwidth, communication start time, and communication duration time used by a communication party with another wireless terminal apparatus, a generating section comparing the communication profile information and past communication permission history, and generating communication permit/deny information indicating communication permission or denial in accordance with the communication profile information, and a transmission section transmitting generated communication permit/deny information to the wireless terminal apparatus.

According to this configuration, communication permit/deny information generated from the results of comparing communication profile information and past communication permission history is transmitted to wireless terminal apparatus, and in the event that competition for wireless resources then occurs, by changing communication profile information or denying start of communication, it is possible to reduce interference and improve communication quality under a communication environment where a plurality of wireless communication schemes are mixed.

Management terminal apparatus according to an eleventh aspect of the present invention adopts a configuration where, in the tenth aspect, the communication profile information acquired by the information acquiring section, in addition to the information (information for the wireless communication scheme, the used frequency bandwidth, communication start time and communication continuation time), further contains at least one of a modulation scheme, encoding rate, transmission power and spreading factor used by the communication party with the other wireless terminal apparatus.

Management terminal apparatus according to a twelfth aspect of the present invention adopts a configuration where, in the tenth aspect, the information acquiring section, in addition to the communication profile information, acquires desired throughput information for between the communication party and the other wireless terminal apparatus, and the generating section calculates expected throughput at each communication link using the communication profile information and past communication permission history, and generates communication permit/deny information indicating permission or denial of communication in accordance with the communication profile information by comparing the expected throughput value and the desired throughput information.

According to this configuration, communication permit/deny information generated from the results of comparing expected throughput values calculated based on communication profile information and desired throughput information is transmitted to wireless terminal apparatus, and it is therefore possible to carry out communication in a state where mutually desired throughput is satisfied even in cases where frequency bandwidth and communication time overlap at each communication link.

Management terminal apparatus according to a thirteenth aspect of the present invention adopts a configuration where, in the twelfth aspect, the information acquiring section, in addition to the communication profile information and the desired throughput information, acquires actual throughput from the wireless terminal apparatus, and the generating section, in addition to the communication profile information and the desired throughput information, calculates expected throughput values using the actual throughput, and generates communication permit/deny information indicating permission or denial of communication according to the communication profile information by comparing the expected throughput values and the desired throughput information.

According to this configuration, at the management terminal apparatus, it is possible to acquire actual throughput occurring in communication based on communication permit information, and it is possible to update actual coefficients utilized during expected throughput value calculations based on differences in this actual throughput and expected throughput values calculated for the communication the throughput is obtained for, making it possible to achieve more accurate expected throughput calculations. Communication permit/deny information generated from the results of comparing accurate expected throughput values and desired throughput information is transmitted to wireless terminal apparatus, and it is therefore possible to carry out communication in a state where mutually desired throughput is satisfied even in cases where frequency bandwidth and communication time overlap at each communication link.

Management terminal apparatus according to a fourteenth aspect of the present invention adopts a configuration where, in the tenth aspect, the information acquiring section receives the communication profile information using a wireless communication scheme different to the wireless communication scheme used by the communication party with the other wireless terminal apparatus, and the transmission section transmits the communication permit/deny information using the same wireless communication scheme as the wireless communication scheme of the receiving section.

According to this configuration, communication profile information is transmitted using a wireless communication scheme different to the wireless communication scheme used by a communication party with another wireless terminal apparatus, and transmission and receipt of communication profile information therefore does not influence communication with wireless terminal apparatus.

Management terminal apparatus according to a fifteenth aspect of the present invention adopts a configuration where, in the tenth aspect, the generating section generates communication permit information containing scheme communication profile information where the information is changed in the case that communication permission is possible if at least one item of information contained in the communication profile information is changed.

According to this configuration, information contained in the communication profile information is changed, and the possibility of communication with wireless terminal apparatus therefore becomes high, competition for wireless resources is prevented, and it is possible to carry out communication with wireless terminal apparatus more efficiently.

Management terminal apparatus according to a sixteenth aspect of the present invention adopts a configuration where, in the twelfth aspect, the generating section generates communication permit information containing changed communication profile information where the information is changed in the case that it is possible for the expected throughput values occurring at each communication link to satisfy the desired throughput if at least one item of information contained in the communication profile information is changed.

According to this configuration, changed communication profile information is transmitted to wireless terminal apparatus in the case that it is possible for the expected throughput values occurring at each communication link to satisfy the desired throughput if at least one item of information contained in the communication profile information is changed, and it is therefore possible to carry out communication in a state where mutually desired throughput is satisfied even in cases where frequency bandwidth and communication time at each communication link overlaps.

Management terminal apparatus according to a seventeenth aspect of the present invention adopts a configuration where, in the twelfth aspect, the generating section changes at least one item of information contained in the communication profile information in such a manner that the total of the expected throughput values for each link is a maximum, and generates communication permit information containing the updated communication profile information where the information is changed.

Management terminal apparatus according to an eighteenth aspect of the present invention adopts a configuration where, in the tenth aspect, a storage section storing communication profile information corresponding to communication permit information as communication permission history is further provided.

According to this configuration, communication profile information corresponding to communication permit information is stored as communication permission history, and it is therefore possible to understand conditions for communication actually carried out with wireless terminal apparatus at the management terminal apparatus more accurately.

Management terminal apparatus according to a nineteenth aspect of the present invention adopts a configuration where, in the eighteenth aspect, in addition to communication permission history, a storage section storing desired throughput information corresponding to communication permit information is further provided.

A wireless communication system according to a twentieth aspect of the present invention adopts a configuration where a wireless communication system having a plurality of wireless terminal apparatus and management terminal apparatus where the wireless terminal apparatus includes a generating section generating communication profile information containing information for a wireless communication scheme, used frequency bandwidth, communication start time, and/or a communication continuation time corresponding to a communication request in the event that the communication request occurs with another wireless terminal apparatus, and a transmission section transmitting generated communication profile information to the management terminal apparatus, and the management terminal apparatus includes a receiving section receiving the communication profile information from the wireless terminal apparatus, a generating section comparing the received communication profile information and past communication permission history, and generating communication permit/deny information indicating communication permission or denial in accordance with the communication profile information, and a transmission section transmitting generated communication permit/deny information to the wireless terminal apparatus.

According to this configuration, wireless terminal apparatus transmits communication profile information to management terminal apparatus, and the management terminal apparatus transmits communication permit/deny information generated from results of comparing communication profile information and past communication permission history to the wireless terminal apparatus. As a result, in the event that competition for wireless resources occurs, the management terminal apparatus changes the communication profile information or denies the start of communication, and it is therefore possible to reduce interference and improve quality under a communication environment where a plurality of wireless communication schemes are mixed.

A wireless communication system according to a twenty-first aspect of the present invention adopts a configuration where, in the twentieth aspect, relay terminal apparatus transmitting, receiving and relaying the communication profile information and the communication permit/deny information between the wireless terminal apparatus and the management terminal apparatus is further provided.

According to this configuration, communication profile information and communication permit/deny information is relayed, and it is therefore possible to decide the wireless communication scheme for between the management terminal apparatus and relay terminal apparatus in advance, and it is not necessary to switch the wireless communication scheme at the management terminal apparatus.

A wireless communication system according to a twenty-second aspect of the present invention adopts a configuration where, in a wireless communication system having a plurality of wireless terminal apparatus and management terminal apparatus, the wireless terminal apparatus includes a generating section generating a trigger signal notifying of a communication request in the event that a communication request occurs with another wireless terminal apparatus, and a transmission section transmitting the generated trigger signal to the management terminal apparatus, and the management terminal apparatus includes a receiving section receiving the trigger signal from the wireless terminal apparatus, an acquiring section receiving the trigger signal and acquiring communication profile information relating to the wireless communication scheme corresponding to the communication request, a generating section comparing the acquired communication profile information and past communication permission history, and generating communication permit/deny information indicating communication permission or denial in accordance with the communication profile information, and a transmission section transmitting generated communication permit/deny information to the wireless terminal apparatus.

According to this configuration, wireless terminal apparatus transmits a trigger signal to management terminal apparatus, and the management terminal apparatus transmits communication permit/deny information generated from results of comparing communication profile information acquired according to the trigger signal and past communication history to the wireless terminal apparatus. As a result, the management terminal apparatus may acquire communication profile information stored in advance, for example, in its own apparatus, or may download communication profile information from outside via the Internet. Therefore, it is not necessary for the wireless terminal apparatus to transmit communication profile information with a large amount of information to the management terminal apparatus, and it is possible to reduce the amount of information transmitted from the wireless terminal apparatus to the management terminal apparatus.

A wireless communication method according to a twenty-third aspect of the present invention adopts a configuration where the wireless communication method for a wireless communication system having a plurality of wireless terminal apparatus and management terminal apparatus, includes the steps of the wireless terminal apparatus generating communication profile information containing information for a wireless communication scheme, used frequency bandwidth, communication start time, and/or a communication continuation time corresponding to a communication request in the event that the communication request occurs with another wireless terminal apparatus, the wireless terminal apparatus transmitting the generated communication profile information, the management terminal apparatus acquiring communication profile information containing information for a wireless communication scheme, used frequency bandwidth, communication start time, and communication continuation time corresponding to a communication request corresponding to the communication request, the management terminal apparatus comparing the acquired communication profile information and past communication permission history, and generating communication permit/deny information indicating communication permission or denial in accordance with the communication profile information, and the management terminal apparatus transmitting generated communication permit/deny information to the wireless, terminal apparatus.

According to this method, the management terminal apparatus acquires communication profile information and transmits communication permit/deny information generated from the results of comparing communication profile information and past communication permission history to the wireless terminal apparatus. As a result, in the event that competition for wireless resources occurs, the management terminal apparatus changes communication profile information or denies start of communication, it is possible to reduce interference and improve communication quality under a communication environment where a plurality of wireless communication schemes are mixed.

Arithmetic apparatus according to a twenty-fourth aspect of the present invention adopt a configuration where arithmetic apparatus calculating interference indicating magnitude of interference incurred by a first communication link from a second communication link applied with a wireless communication scheme different to that of the first communication link, includes a setting section setting an interference parameter coefficient indicating a relative ratio of change in influence of interference in the case that each communication parameter occurring in a wireless communication scheme applied to the first communication link changes, a unit time for calculating degree of interference, a first link bandwidth indicating a frequency band utilized by the first communication link at each timing within the unit time, an overlapping frequency bandwidth indicating a bandwidth of a frequency band of overlapping of the frequency band utilized at the first communication link and the frequency band utilized at the second communication link for each timing, a first power value for the first communication link occurring at each timing, and a second power value for the second communication link occurring at the overlapping frequency band, and a calculating section calculating the degree of interference from the set values using the following equation.

[Equation 10]

$$\text{Degree of interference} = \frac{\text{Interference parameter coefficient}}{\text{Unit time}} \times \int_{\text{Unit time}} \frac{\text{Overlapping bandwidth}}{\text{First link bandwidth}} \times \frac{\text{Second power value}}{\text{First power value} + \text{Second power value}}$$

Operation apparatus according to a twenty-fifth aspect of the present invention includes a setting section setting degree of interference indicating magnitude of interference incurred by a first communication link from a second communication link applied with a wireless communication scheme different to that of the first communication link, reference throughput relating to a wireless communication scheme applied to the first communication link, and a throughput parameter coefficient indicating a ratio with respect to the reference throughput of the throughput in the case of changing the parameter corresponding to the reference throughput to another parameter, and a calculating section calculating an expected throughput for the first communication link from the set values using the following equation.

[Equation 11]

$$\text{Expected throughput value} = \text{Reference throughput} \times \text{Throughput parameter coefficient} \times (1 - \text{Degree of interference})$$

This specification is based on the Japanese Patent Application No. 2004-310813 filed on Oct. 26, 2004, and the Japanese patent application No. 2005-310039 filed on Oct. 25, 2005, the entire content of which is expressly incorporated by reference herein.

INDUSTRIAL APPLICABILITY

The wireless terminal apparatus, management terminal apparatus and wireless communication method according to the present invention are capable of reducing interference occurring and improving communication quality under a communication environment where a plurality of wireless communication schemes are mixed, and are useful in, for example, a wireless communication system or the like in the homes or office where a plurality of wireless communication schemes are mixed.

Figure 1:
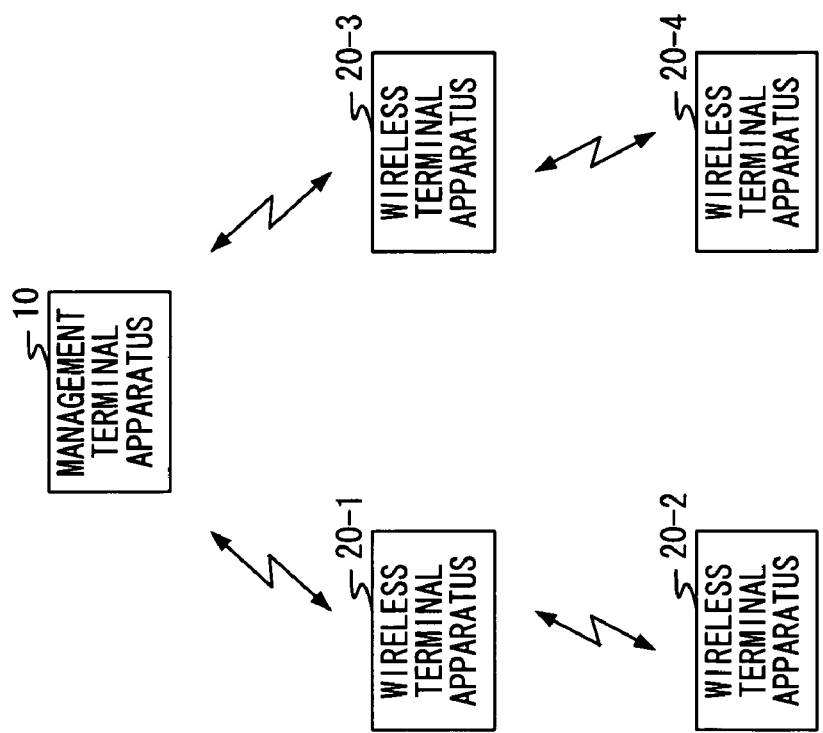
FIG. 1 is a figure showing an example of a wireless communication system.

FIG. 1
MANAGEMENT TERMINAL APPARATUS 10
WIRELESS TERMINAL APPARATUS 20-1
WIRELESS TERMINAL APPARATUS 20-2
WIRELESS TERMINAL APPARATUS 20-3
WIRELESS TERMINAL APPARATUS 20-4

FIG. 2
MANAGEMENT TERMINAL APPARATUS 200
WIRELESS TERMINAL APPARATUS 100-1
WIRELESS TERMINAL APPARATUS 100-2
WIRELESS TERMINAL APPARATUS 100-3
WIRELESS TERMINAL APPARATUS 100-4

FIG. 3
CONTROL SECTION 110
COMMUNICATION PROFILE GENERATING SECTION 120
STORAGE SECTION 130
WIRELESS SECTION 140

FIG. 4 (SELECTED VIEW)
COMMUNICATION PERMISSION GENERATING SECTION 220
WIRELESS SECTION 210
STORAGE SECTION 230

Figure 5A:
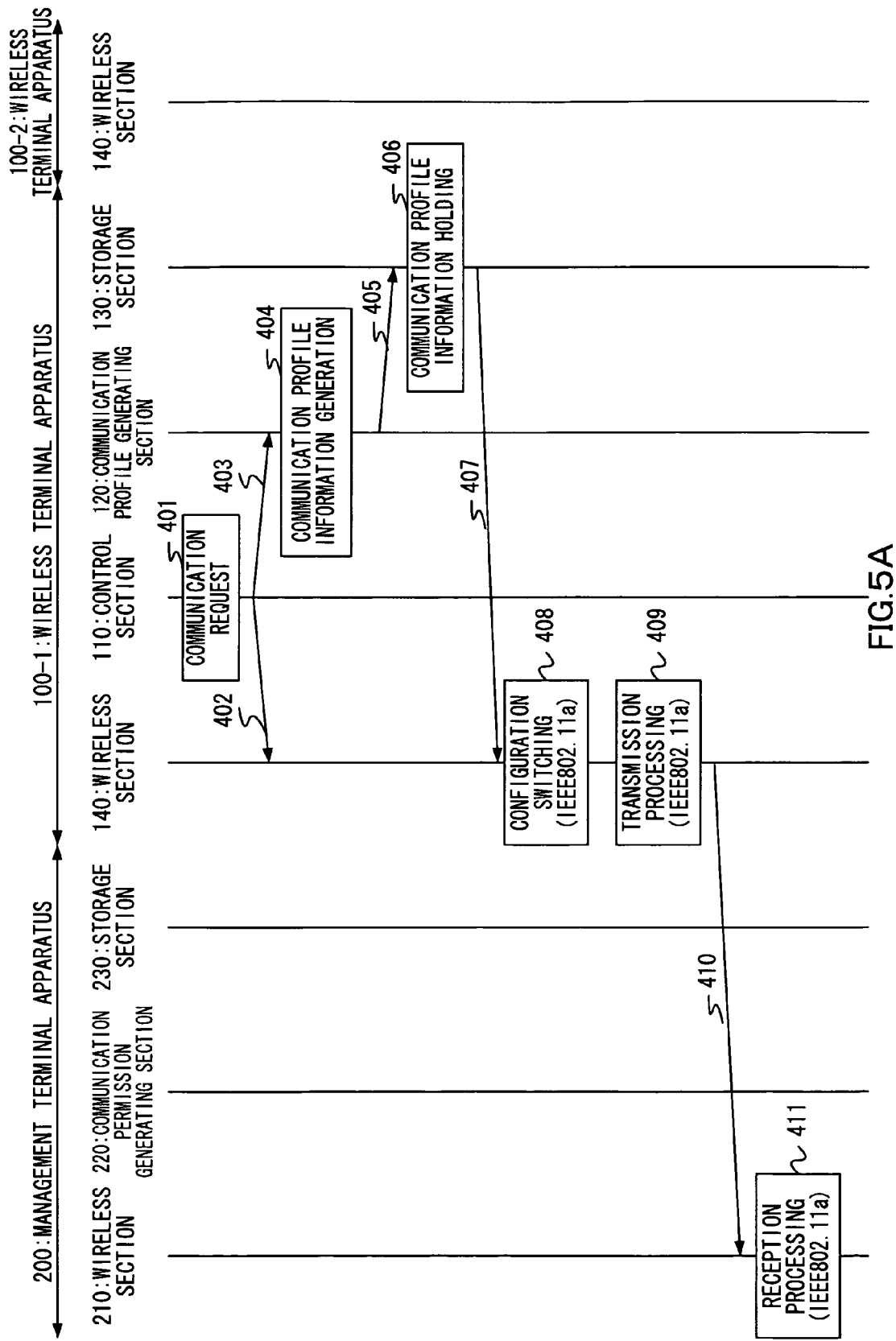
FIG. 5A is a sequence drawing showing an operation of a wireless terminal apparatus and management terminal apparatus according to Embodiment 1.

FIG. 5A
MANAGEMENT TERMINAL APPARATUS 200
WIRELESS TERMINAL APPARATUS 100-1
WIRELESS TERMINAL APPARATUS 100-2
WIRELESS SECTION 210
COMMUNICATION PERMISSION GENERATING SECTION 220
STORAGE SECTION 230
WIRELESS SECTION 140
CONTROL SECTION 110
COMMUNICATION PROFILE GENERATING SECTION 120
STORAGE SECTION 130
WIRELESS SECTION 140
401 COMMUNICATION REQUEST
404 COMMUNICATION PROFILE INFORMATION GENERATION
406 COMMUNICATION PROFILE INFORMATION HOLDING
408 CONFIGURATION SWITCHING
409 TRANSMISSION PROCESSING
411 RECEPTION PROCESSING

Figure 5B:
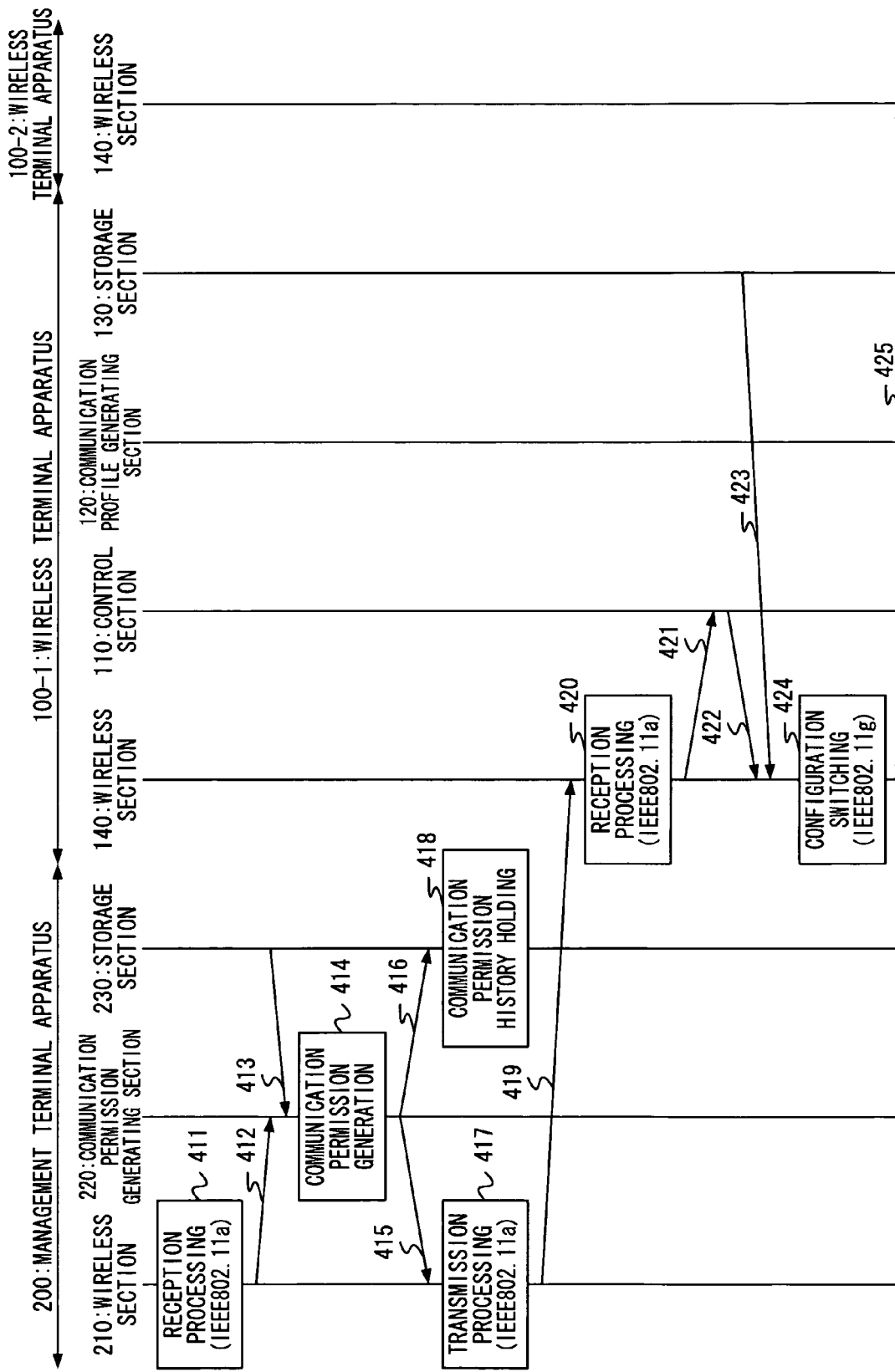
FIG. 5B is a continuation of FIG. 5A.

FIG. 5B
MANAGEMENT TERMINAL APPARATUS 200
WIRELESS TERMINAL APPARATUS 100-1
WIRELESS TERMINAL APPARATUS 100-2
WIRELESS SECTION 210
COMMUNICATION PERMISSION GENERATING SECTION 220
STORAGE SECTION 230
WIRELESS SECTION 140
CONTROL SECTION 110
COMMUNICATION PROFILE GENERATING SECTION 120
STORAGE SECTION 130
WIRELESS SECTION 140
411 RECEPTION PROCESSING
414 COMMUNICATION PERMISSION GENERATION
417 TRANSMISSION PROCESSING
418 COMMUNICATION PERMISSION HISTORY HOLDING
420 RECEPTION PROCESSING
424 CONFIGURATION SWITCHING

FIG. 6

START
S1000 REFER TO COMMUNICATION PROFILE INFORMATION
S1100 FREQUENCY OVERLAPPED?
S1200 COMMUNICATION TIME OVERLAPPED?
S1300 COMMUNICATION POSSIBLE AT DIFFERENT FREQUENCY?
S1400 COMMUNICATION START TIME CAN BE CHANGED?

S1500 MODULATION SCHEME·ENCODING RATE CAN BE CHANGED?
S1600 CHANGE MODULATION SCHEME·ENCODING RATE
S1700 CALCULATE COMMUNICATION CONTINUATION TIME·TRANSMISSION POWER
S1800 PERMIT COMMUNICATION
S1900 DENY COMMUNICATION
END

FIG. 8
COMMUNICATION LINK 300-2
COMMUNICATION CONTINUATION TIME
COMMUNICATION LINK 300-1
COMMUNICATION CONTINUATION TIME

FIG. 10
MANAGEMENT TERMINAL APPARATUS 200
RELAY TERMINAL APPARATUS 600-1
RELAY TERMINAL APPARATUS 600-2
WIRELESS TERMINAL APPARATUS 100-1
WIRELESS TERMINAL APPARATUS 100-1
WIRELESS TERMINAL APPARATUS 100-3
WIRELESS TERMINAL APPARATUS 100-3
WIRELESS TERMINAL APPARATUS 100-2
WIRELESS TERMINAL APPARATUS 100-2
WIRELESS TERMINAL APPARATUS 100-4
WIRELESS TERMINAL APPARATUS 100-4

FIG. 11
CONTROL SECTION 620
STORAGE SECTION 630
WIRELESS SECTION 610

FIG. 12A
MANAGEMENT TERMINAL APPARATUS 200
RELAY TERMINAL APPARATUS 600-1
WIRELESS TERMINAL APPARATUS 100-1
WIRELESS SECTION 610
CONTROL SECTION 620
STORAGE SECTION 630
401 COMMUNICATION REQUEST
404 COMMUNICATION PROFILE INFORMATION GENERATION
408 CONFIGURATION SWITCHING
409 TRANSMISSION PROCESSING
802 RECEPTION PROCESSING
806 CONFIGURATION SWITCHING
807 TRANSMISSION PROCESSING
411 RECEPTION PROCESSING

FIG. 12B
MANAGEMENT TERMINAL APPARATUS 200
RELAY TERMINAL APPARATUS 600-1
WIRELESS TERMINAL APPARATUS 100-1
WIRELESS SECTION 610
CONTROL SECTION 620
STORAGE SECTION 630
411 RECEPTION PROCESSING
414 COMMUNICATION PERMISSION GENERATION
417 TRANSMISSION PROCESSING
810 RECEPTION PROCESSING
814 CONFIGURATION SWITCHING
815 TRANSMISSION PROCESSING
420 RECEPTION PROCESSING
424 CONFIGURATION SWITCHING

FIG. 13
MANAGEMENT TERMINAL APPARATUS 1200
WIRELESS TERMINAL APPARATUS 100-1
WIRELESS TERMINAL APPARATUS 100-3
WIRELESS TERMINAL APPARATUS 100-2
WIRELESS TERMINAL APPARATUS 100-4

FIG. 14
COMMUNICATION PERMISSION GENERATING SECTION 1220
WIRELESS SECTION 210
STORAGE SECTION 230

FIG. 15
GENERATING SECTION 1223
EXPECTED THROUGHPUT VALUE CALCULATING SECTION 1222
DETERMINING SECTION 1221
WIRELESS SECTION 210
STORAGE SECTION 230

FIG. 16A
MANAGEMENT TERMINAL APPARATUS 1200
WIRELESS TERMINAL APPARATUS 100-1
WIRELESS TERMINAL APPARATUS 100-2
WIRELESS SECTION 210
COMMUNICATION PERMISSION GENERATING SECTION 1220
STORAGE SECTION 230
WIRELESS SECTION 140
CONTROL SECTION 110
COMMUNICATION PROFILE GENERATING SECTION 120
STORAGE SECTION 130
WIRELESS SECTION 140
401 COMMUNICATION REQUEST
404 COMMUNICATION PROFILE INFORMATION GENERATION
406 COMMUNICATION PROFILE INFORMATION HOLDING
408 CONFIGURATION SWITCHING
409 TRANSMISSION PROCESSING
411 RECEPTION PROCESSING

FIG. 16B
MANAGEMENT TERMINAL APPARATUS 1200
WIRELESS TERMINAL APPARATUS 100-1
WIRELESS TERMINAL APPARATUS 100-2
WIRELESS SECTION 210
COMMUNICATION PERMISSION GENERATING SECTION 1220
STORAGE SECTION 230
WIRELESS SECTION 140
CONTROL SECTION 110
COMMUNICATION PROFILE GENERATING SECTION 120
STORAGE SECTION 130
WIRELESS SECTION 140
411 RECEPTION PROCESSING
1501 COMMUNICATION PERMISSION GENERATION
417 TRANSMISSION PROCESSING
418 COMMUNICATION PERMISSION HISTORY HOLDING
420 RECEPTION PROCESSING
424 CONFIGURATION SWITCHING

Figure 17:
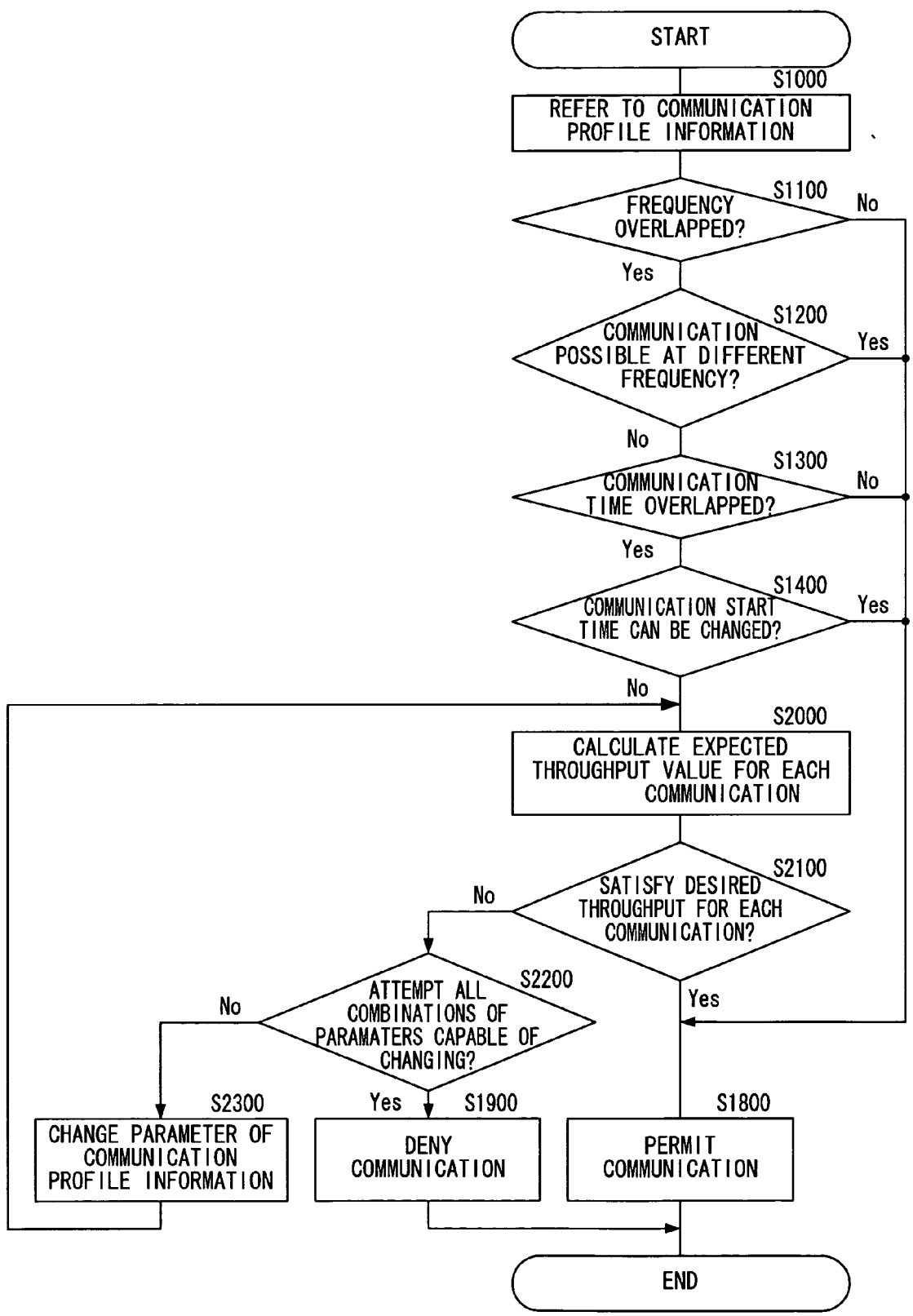
FIG. 17 is a flow diagram showing an operation for generating communication permit/deny information according to Embodiment 3.

FIG. 17
STARTS1000 REFER TO COMMUNICATION PROFILE INFORMATION
S1100 FREQUENCY OVERLAPPED?
S1200 COMMUNICATION POSSIBLE AT DIFFERENT FREQUENCY?
S1300 COMMUNICATION TIME OVERLAPPED?
S1400 COMMUNICATION START TIME CAN BE CHANGED?
S2000 CALCULATE EXPECTED THROUGHPUT VALUE FOR EACH COMMUNICATION
S2100 SATISFY DESIRED THROUGHPUT FOR EACH COMMUNICATION?
S2200 ATTEMPT ALL COMBINATIONS OF PARAMATERS CAPABLE OF CHANGING?
S1800 PERMIT COMMUNICATION
S1900 DENY COMMUNICATION
S2300 CHANGE PARAMETER OF COMMUNICATION PROFILE INFORMATION

END
Equations
Expected throughput value
Reference throughput
Throughput parameter coefficient
Degree of interference
Interference parameter coefficient
Unit time
Overlapping bandwidth
Own bandwidth
Other overlapping communication link power
Own power
Second
Transmission power
First link bandwidth
Second power value
First power value

The invention claimed is:

1. A management terminal apparatus comprising:
an information acquiring section acquiring communication profile information containing information for a wireless communication scheme, used frequency bandwidth, communication start time and communication duration time used by a wireless terminal apparatus with another wireless terminal apparatus;
a generating section comparing the communication profile information and past communication permission history, and generating communication permit/deny information indicating communication permission or denial in accordance with the communication profile information; and
a transmission section transmitting generated communication permit/deny information to the wireless terminal apparatus.

2. The management terminal apparatus according to claim 1, wherein the communication profile information acquired by the information acquiring section, in addition to the information, further contains at least one of a modulation scheme, encoding rate, transmission power and spreading factor used by the wireless terminal apparatus with the other wireless terminal apparatus.

3. The management terminal apparatus according to claim 1, wherein:
the information acquiring section, in addition to the communication profile information, acquires desired throughput information for the wireless terminal apparatus and the other wireless terminal apparatus; and
the generating section calculates expected throughput values at each communication link using the communication profile information and past communication permission history, and generates communication permit/deny information indicating communication permission or denial in accordance with the communication profile information by comparing the expected throughput value and the desired throughput information.

4. The management terminal apparatus according to claim 3, wherein:
the information acquiring section, in addition to the communication profile information and the desired throughput information, acquires actual throughput from the wireless terminal apparatus; and
the generating section, in addition to the communication profile information and the desired throughput information, calculates expected throughput values using the actual throughput, and generates communication permit/deny information indicating communication permission or denial according to the communication profile information by comparing the expected throughput values and the desired throughput information.

5. The management terminal apparatus of claim 1, wherein:
the information acquiring section receives the communication profile information using a wireless communication scheme different from the wireless communication scheme used by the wireless terminal apparatus with the other wireless terminal apparatus; and
the transmission section transmits the communication permit/deny information using the same wireless communication scheme as the wireless communication scheme of the receiving section.

6. The management terminal apparatus of claim 1, wherein the generating section generates communication permit information containing changed communication profile information where the information is changed in the case that communication permission is possible if at least one item of information contained in the communication profile information is changed.

7. The management terminal apparatus of claim 3, wherein:
the generating section generates communication permit information containing changed communication profile information where the information is changed in the case that it is possible for the expected throughput values occurring at each communication link to satisfy the desired throughput if at least one item of information contained in the communication profile information is changed.

8. The wireless terminal apparatus of claim 3, wherein the generating section changes at least one item of information contained in the communication profile information in such a manner that a total of the expected throughput values for each link is a maximum, and generates communication permit information containing updated communication profile information where the information is changed.

9. The management terminal apparatus according to claim 1, further comprising a storage section storing communication profile information corresponding to communication permit information as communication permission history.

10. The management terminal apparatus according to claim 9, wherein the storage section additionally stores required throughput information corresponding to communication permit information.

11. A wireless terminal apparatus comprising:

a generating section generating communication profile information containing information for a wireless communication scheme, used frequency bandwidth, communication start time, and/or a communication continuation time corresponding to a communication request in the event that the communication request occurs with another wireless terminal apparatus; and a transmission section transmitting generated communication profile information to a management terminal apparatus, wherein the transmission section transmits the communication profile information using a wireless communication scheme different from the wireless communication scheme corresponding to the communication request.

* * * * *